(12) United States Patent
Raduchel

(10) Patent No.: US 11,700,353 B2
(45) Date of Patent: Jul. 11, 2023

(54) INTEGRATION OF REMOTE AUDIO INTO A PERFORMANCE VENUE

(71) Applicant: eIngot LLC, Great Falls, VA (US)

(72) Inventor: William J. Raduchel, Palo Alto, CA (US)

(73) Assignee: eIngot LLC, Great Falls, VA (US)

( * ) Notice: Subject to any disclaimer, the term of this patent is extended or adjusted under 35 U.S.C. 154(b) by 122 days.

(21) Appl. No.: 17/087,735

(22) Filed: Nov. 3, 2020

(65) Prior Publication Data

US 2021/0314525 A1 Oct. 7, 2021

Related U.S. Application Data

(60) Provisional application No. 63/005,917, filed on Apr. 6, 2020.

(51) Int. Cl.
*H04N 7/15* (2006.01)
*H04L 65/4053* (2022.01)
*H04R 27/00* (2006.01)

(52) U.S. Cl.
CPC ......... *H04N 7/152* (2013.01); *H04L 65/4053* (2013.01); *H04R 27/00* (2013.01)

(58) Field of Classification Search
CPC .... G06F 3/1454; G06F 16/9537; G06F 3/011; G06F 3/167; G06Q 10/10; G06Q 30/02; G06Q 30/0207; G06Q 30/0251; G06T 19/006; G06T 19/003; G07F 17/38; H04H 60/04; H04H 60/15; H04L 65/4053; H04L 65/61; H04L 65/765; H04L 65/80; H04L 12/1813; H04L 12/1818; H04N 7/15; H04N 7/152; H04N 7/157; H04N 13/344; H04N 21/2187; H04N 21/25891; H04N 21/41415; H04N 21/4312; H04N 21/47202; H04N 21/4756; H04N 21/4788; H04N 21/6581; H04N 21/6587; H04N 21/8106; H04N 21/854; H04N 5/265; H04N 7/181;
(Continued)

(56) References Cited

U.S. PATENT DOCUMENTS 7,587,214 B2 * 9/2009 Inselberg ............... G06Q 30/02
455/3.06
8,214,254 B1 * 7/2012 Mowry .............. G06Q 30/0207
705/14.1
(Continued)

OTHER PUBLICATIONS

International Search Report and Written Opinion in International Appln. No. PCT/US2021/025916, dated Jul. 16, 2021, 17 pages.
(Continued)

*Primary Examiner* — Gerald Gauthier
(74) *Attorney, Agent, or Firm* — Fish & Richardson P.C.

(57) ABSTRACT

Methods, systems, and apparatus, including computer programs encoded on a computer storage medium, for validating and publishing workflows from remote environments. In some implementations, a link that includes at least one of audio data and video data is established between a wireless device of a remote participant and a computational mixer. A profile for the remote participant is referenced. A venue signal related to the at least one audio data and video data is generated based on the profile for the remote participant and using the computational mixer. The venue signal is transmitted.

33 Claims, 15 Drawing Sheets

(58) Field of Classification Search
CPC .... H04N 7/188; H04R 27/00; H04R 2499/15; H04R 2227/003; H04S 7/302; H04S 2400/11; H04S 2400/13; A63F 13/213; H04M 3/568
USPC ......... 345/419; 348/14.09; 381/77; 455/517; 705/5, 14.49; 715/751, 753, 757
See application file for complete search history.

(56) References Cited

U.S. PATENT DOCUMENTS

| | | | | |
|---|---|---|---|---|
| 9,031,855 | B2* | 5/2015 | Ohmura | H04N 7/15 705/5 |
| 9,066,144 | B2* | 6/2015 | Yerli | H04N 21/4756 |
| 9,544,538 | B2* | 1/2017 | Cahill | H04N 5/265 |
| 9,861,878 | B2* | 1/2018 | Penna | G07F 17/38 |
| 10,009,568 | B1* | 6/2018 | Ellis | G06F 3/1454 |
| 10,699,482 | B2* | 6/2020 | Demirli | G06T 19/003 |
| 10,937,239 | B2* | 3/2021 | Huston | G06F 16/9537 |
| 11,115,765 | B2* | 9/2021 | Metzar | G06V 20/00 |
| 2004/0002049 | A1* | 1/2004 | Beavers | H04L 12/1813 434/350 |
| 2004/0003040 | A1* | 1/2004 | Beavers | H04N 7/15 348/E7.083 |
| 2007/0022447 | A1* | 1/2007 | Arseneau | H04H 60/15 725/38 |
| 2007/0240190 | A1* | 10/2007 | Arseneau | H04N 7/181 348/E7.071 |
| 2010/0182436 | A1* | 7/2010 | Boman | H04N 7/188 342/450 |
| 2010/0290638 | A1* | 11/2010 | Heineman | H04H 60/04 381/77 |
| 2011/0126255 | A1 | 5/2011 | Perlman et al. | |
| 2011/0225039 | A1* | 9/2011 | Goldman | G06Q 30/02 715/757 |
| 2011/0225516 | A1* | 9/2011 | Goldman | G06Q 30/02 715/753 |
| 2011/0225517 | A1* | 9/2011 | Goldman | G06Q 10/10 715/757 |
| 2012/0060101 | A1* | 3/2012 | Vonog | H04N 21/4788 715/751 |
| 2012/0192087 | A1* | 7/2012 | Lemmey | H04L 65/80 715/753 |
| 2013/0216063 | A1* | 8/2013 | Sherman | H04M 3/568 381/82 |
| 2014/0006518 | A1* | 1/2014 | Sinkov | H04L 12/1818 709/205 |
| 2014/0033078 | A1* | 1/2014 | Goldman | G06Q 30/02 715/757 |
| 2014/0098180 | A1 | 4/2014 | Periyannan et al. | |
| 2016/0027209 | A1* | 1/2016 | Demirli | G06T 19/006 345/419 |
| 2018/0316948 | A1* | 11/2018 | Todd | H04N 21/4312 |
| 2018/0374145 | A1* | 12/2018 | Koon | G06Q 30/0251 |
| 2019/0104235 | A1* | 4/2019 | Sarkar | H04N 13/344 |
| 2019/0208278 | A1 | 7/2019 | Pinto et al. | |
| 2020/0333997 | A1* | 10/2020 | Metzar | H04R 27/00 |
| 2021/0314525 | A1* | 10/2021 | Raduchel | H04L 65/4053 |

OTHER PUBLICATIONS

International Preliminary Report on Patentability in International Appln. No. PCT/US2021/025916, dated Oct. 20, 2022, 16 pages.

* cited by examiner

INTEGRATION OF REMOTE AUDIO INTO A PERFORMANCE VENUE

CROSS REFERENCE TO RELATED APPLICATION

This application claims the benefit of U.S. Application No. 63/005,917, filed on Apr. 6, 2020, which is incorporated by reference.

BACKGROUND

This document generally relates to audio systems.

SUMMARY

A user attempting to participate in an event remotely may place a premium on the ability to technologically mimic those aspects of the event and venue that would otherwise only be present by actually participating in an event. For example, a fan of a professional basketball game may enjoy the fan conversations and live cheering as much as they enjoy the event itself. In fact, a participant may enjoy the opportunity to "cheer" their team to victory by enthusiastically supporting their team. Such enthusiasm can lead to a home field advantage, and the ability to provide the home field advantage provides many fans with a sense of tremendous satisfaction.

Similarly, participants in a game may derive great energy from playing in front of a crowds that provide an ambient level of audio and visual enthusiasm. The roar of the crowd may fuel adrenaline, which in turn allows the user to maintain a high energy level during an event. Similarly, the absence of enthusiasm may have a depressive effect on participants, especially when a player is accustom to maintaining a high energy level.

The present COVID-19 pandemic has interrupted sporting events throughout the world as organizations suspend their operations in order to comport with social distancing guidelines. Even when operations resume, the operations may be limited to smaller attendees. For example, a league may limit actual attendance to the players and minimal support staff without allowing attendance by spectators. Even where more participation is permitted, providing a richer audio experience that reflects larger attendance may help athletes perceive that they are appearing in front a larger audience.

In some implementations, a mixer may be used to provide a facility and fans with an ambient audio/video that reflects the active participation of remote users. Thus, a mixer may facilitate this interaction by interfacing with an audio system. Specifically, this audio system is used to provide audio from distributed sources into a venue. The mixer performs operations that include establishing a link that includes audio data between a remote participant and an audio mixer. The link may include a TCP/IP connection or similar network protocols between a wireless device (e.g., a smartphone) and a network connection for a server acting as a mixer.

In some implementations, instead of using a TCP/IP logical transport layer, the link may use one or more other low latency transport layer technologies. For example, the link between a wireless device (e.g., a smartphone) and a network connection for a server acting as a mixer may use a KCP transport protocol.

In some implementations, the mixer references a profile for the remote participant. For example, the mixer may determine that a particular user has purchased the right to a particular seat in the second row of the venue. The profile may be associated with a user name and password system that the user enters when logging into a virtual ticket application on a wireless phone. The profile also may be associated with a particular audio transformation or setting. For example, if the user has selected section 101, row 2, seat 3, the profile may be associated with an audio transformation or setting that is used to project that audio from the user's device to the venue. In some cases, the profile designates which speaker system should be used. In another instance, the profile designates how the user wishes their audio to be related to other audio streams. For example, the user may pay a premium to hear fan commentary from an entertaining celebrity. Alternatively, or in addition, the user may wish to have their audio mixed with selected members of their social network. Thus, much like actual attendance at an event, the user may enjoy an authentic experience with actual crowd noises mixed with a specified number of individuals that a user would sit with during the game.

Based on the profile for the remote participant, the audio mixer is used to generate a venue signal that is related to the audio data. Thus, the audio mixer may attenuate different audio signals to reflect appropriate crowd noises. In one configuration, the audio mixer is the audio configuration for a stadium to modify a signal so that it is perceived by players as originating from a particular location in the crowd. This may include, for example, by routing the user's audio information to a particular speaker system that is located in the user's seat itself. Alternatively, the audio signal may be modified with a transform function that accounts for the actual location of the speaker relative to the purported source of the data (e.g., the identified seat). The mixer may apply a per-stream FFT (Fast Fourier Transform) that is applied to each signal that accounts for the actual placement of the speaker. The transformed signals from more than one user then may be aggregated for delivery to one or more speaker systems. The mixer then may enable a venue sound system to access the venue signal. For example, the mixer may send the signal to an amplifier and speaker system located at a particular location. In another example, the mixer may encapsulate the transformed signal in a TCP/IP packet(s) (or similar network protocol packet(s)) and use a wireless network to transmit the TCP/IP packets(s) (or similar network protocol packet(s)) to one or more powered speaker systems located in the venue.

In one general aspect, a method includes: establishing a link that includes at least one of audio data and video data between a wireless device of a remote participant and a computational mixer; referencing a profile for the remote participant; generating, based on the profile for the remote participant and using the computational mixer, a venue signal that is related to the at least one audio data and video data; and transmitting the venue signal.

Implementations may include one or more of the following features. For example, in some implementations, establishing the link includes establishing the link between a virtual participant application on the wireless device and a communications interface on the computational mixer.

In some implementations, establishing the link between the virtual participant application on the wireless device and the communications interface on the computational mixer includes transmitting at least one of audio data and video data corresponding to the remote participant from the wireless device to the computational mixer.

In some implementations, establishing the link between the virtual participant application on the wireless device and the communications interface on the computational mixer includes transmitting at least one of audio data and video data from the computational mixer to the wireless device.

In some implementations, establishing the link between a virtual participant application on the wireless device and a communications interface on the computational mixer includes establishing a 5G network connection.

In some implementations, establishing the link includes establishing a link that is used to communicate one or more of the following: audio data of the remote participant; video data of the remote participant; audio data of one or more other remote participants; video data of one or more other remote participants; audio data recorded by one or more microphones in a venue hosting an event that the remote participant is virtually attending; video data recorded using one or more cameras in a venue hosting an event that the remote participant is virtually attending; audio data of one or more performers of an event that the remote participant is attending; video data of one or more performers of an event that the remote participant is attending; audio data of one or more hosts of an event that the remote participant is attending; or video data of one or more hosts of an event that the remote participant is attending.

In some implementations, referencing the profile for the remote participant includes referencing a social media configured to enable access to other profiles for other users.

In some implementations, referencing the profile for the remote participant includes referencing a designated location within a venue hosting an event that the remote participant is virtually attending.

In some implementations, referencing the profile for the remote participant includes referencing a logical transformation that describes a modification to the at least one audio data and video data.

In some implementations, referencing the logical transformation includes referencing a transformation that modifies the at least one audio data and video data so that the at least one audio data and video data is perceived as originating from a location other than a location associated with at least one of: a speaker used to provide an audio manifestation of the venue signal; headphones used to provide an audio manifestation of the venue signal; earphones used to provide an audio manifestation of the venue signal; or a display used to provide a video manifestation of the venue signal.

In some implementations, referencing a logical transformation includes referencing a transformation that modifies at least a portion of the at least one audio data and video data that corresponds to other remote participants based on one or more of the following: a distance from a location corresponding to the remote participant to a location corresponding to a remote participant of the other remote participants; an identity of a remote participant of the other remote participants; a remote participant of the other remote participants being identified as a friend of the remote participant; a remote participant of the other remote participants being identified as a family member of the remote participant; or a remote participant of the other remote participants being identified as a celebrity.

In some implementations, referencing the profile for the remote participant includes referencing the profile to determine that the remote participant has selected to receive at least one of audio data and video data from a second remote participant identified in the profile, and generating the venue signal includes providing the at least one of audio data and video data from the second remote participant to the computational mixer.

In some implementations, referencing the profile for the remote participant includes referencing the profile to determine that remote participant has selected to interact with a second remote participant identified in the profile, and where generating the venue signal includes: generating a first venue signal by providing at least one of audio data and video data from the remote participant to the computational mixer; transmitting the first venue signal to a wireless device of the second remote participant; generating a second venue signal by providing at least one of audio data and video data from the second remote participant to the computational mixer; and transmitting the second venue signal to the wireless device of the remote participant.

In some implementations, referencing the profile for the remote participant includes identifying a speaker that will be used to render an audio manifestation of the venue signal.

In some implementations, referencing the profile for the remote participant includes identifying at least one of: an event that the remote participant has registered to virtually attend; or a venue hosting an event that the remote participant has registered to virtually attend.

In some implementations, generating, based on the profile for the remote participant and using the computational mixer, the venue signal includes identifying a speaker that will be used to render an audio manifestation of the venue signal.

In some implementations, generating, based on the profile for the remote participant and using the computational mixer, the venue signal includes specifying a volume level for the venue signal.

In some implementations, where generating, based on the profile for the remote participant and using the computational mixer, the venue signal includes mixing the at least one of audio data and video data for the remote participant with other audio data and/or video data from other users to generate the venue signal.

In some implementations, generating, based on the profile for the remote participant and using the computational mixer, the venue signal includes mixing at least one of audio data and video data for two or more users in a social network.

In some implementations, generating, based on the profile for the remote participant and using the computational mixer, the venue signal includes mixing the at least one of audio data and video data for the remote participant with one or more of the following: audio data captured using one or more microphones in a venue corresponding to an event that the remote participant is virtually attending; video data captured using one or more cameras in a venue corresponding to an event that the remote participant is virtually attending; audio data corresponding to one or more performers of the event in the venue; video data corresponding to one or more performers of the event in the venue; audio data corresponding to one or more hosts of the event in the venue; video data corresponding to one or more hosts of the event in the venue; audio data corresponding to one or more other remote participants virtually attending the event in the venue; or video data corresponding to one or more other remote participants virtually attending the event in the venue.

In some implementations, generating, based on the profile for the remote participant and using the computational mixer, the venue signal includes: accessing at least one of audio and video settings specified in the profile for the remote participant; and generating the venue signal based on the at least one audio and video settings.

In some implementations, accessing the at least one audio and video settings comprises accessing one or more of the following: audio power contribution settings corresponding to sources of audio data; audio power contribution settings corresponding to particular remote participants; audio power contribution settings corresponding to particular group of remote participants; audio power contribution settings corresponding to virtual distances between virtual seats reserved by other remote participants and a virtual seat of the remote participant; video settings corresponding to sources of video data; video settings corresponding to particular remote participants; video settings corresponding to a particular group of remote participants; video settings corresponding to virtual distances between virtual seats reserved by other remote participants and a virtual seat of the remote participant; interactivity settings corresponding to particular remote participants; interactivity settings corresponding to a particular group of remote participants; or interactivity settings corresponding to virtual distances between virtual seats reserved by other remote participants and a virtual seat of the remote participant, and generating the venue signal based on the at least one audio and video settings comprises generating the venue signal based on the accessed settings.

In some implementations, transmitting the venue signal includes enabling a venue sound system to access the venue signal.

In some implementations, enabling the venue sound system to access the venue signal includes transmitting the venue signal to a particular speaker or group of speakers using a network connection.

In some implementations, enabling the venue sound system to access the venue signal includes routing the venue signal to a particular amplifier.

In some implementations, transmitting the venue signal includes transmitting the venue signal to a wireless device of the remote participant.

In some implementations, transmitting the venue signal to the wireless device of the remote participant includes transmitting the venue signal to the wireless device to present a virtual reality environment to the remote participant or an augmented reality environment to the remote participant.

In some implementations, the wireless device or one or more second devices that are capable of communicating with the wireless device include one or more of the following: a television in proximity to the remote participant; a speaker in proximity to the remote participant; headphones worn by the remote participant; earphones worn by the remote participant; or a virtual reality headset worn by the remote participant.

In some implementations, establishing the link includes establishing a link that includes audio data between a remote participant and the computational mixer that includes an audio mixer.

In some implementations, establishing the link includes establishing a link that includes video data between the remote participant and the computational mixer that includes a video mixer.

In some implementations, generating the venue signal includes generating a venue signal that is related to the video data establishing the link.

In some implementations, generating the venue signal that is related to the video data includes: generating one or more three-dimensional models corresponding to at least one of the remote participant or one or more other remote participants; and using the computation mixer to composite the one or more three-dimensional models with video data captured from a camera in a venue hosting an event that the remote participant is virtually attending. The subject matter described in this specification can be implemented in particular embodiments so as to realize one or more of the following advantages. For example, the described system can be used to improve virtual environments and to provide an in-person type experience for an event from a remote location. As described below, a system can generate a composite audiovisual signal from multiple sources including multiple audiovisual sources corresponding to multiple remote participants. The system can receive the source signals and/or transmit the composite signals over a low latency network, such a 5G mobile network, in order to provide a seamless virtual experience. For example, remote devices can use the composite audio signal to present a virtual/augmented reality environment to remote users such the video and/or audio between the remote users and that of a particular event are synchronized.

Numerous health benefits can also be realized using the described system. Notably, by providing a virtual environment to view various types of events with little to no perceivable lag, people will be provided an in-person like experience from the comfort and safety of their home. As such, these remote participants will be less motivated to attend potentially crowded events in person that could put them and others at a serious health risk due to, for example, COVID-19 among other potential ailments.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
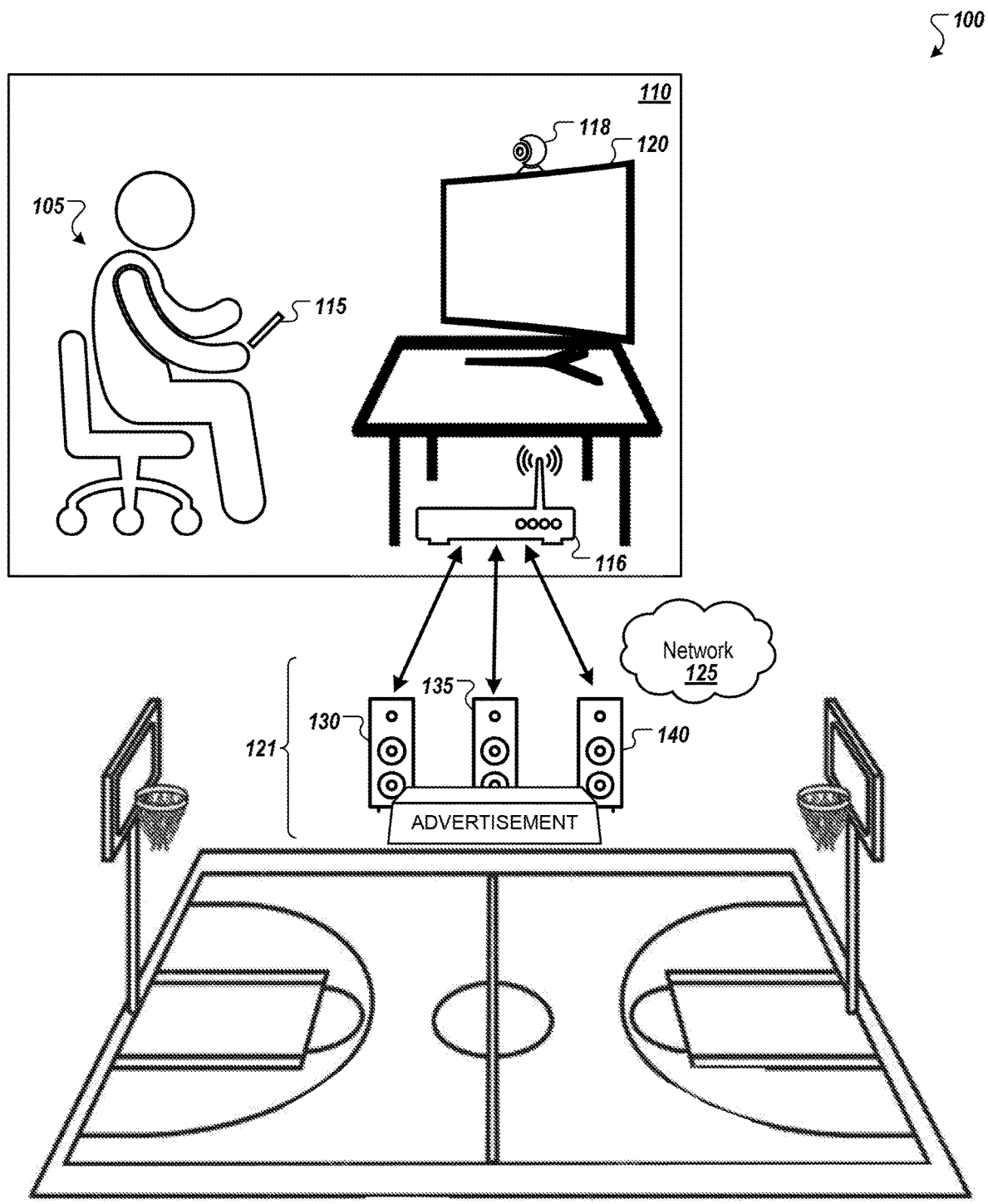
FIG. 1 is an example logical diagram of a distributed audio system.

FIG. 1 is a logical diagram of a distributed audio system 100 that enables a remote studio 110 to interface with a venue system 121. Generally, a mixer provides audio data from the remote studio 100 for a remote participant 105 and routes some instantiation of that audio data to the venue system 121 in order to create some audio presence of the remote participant 105 in the venue.

The remote studio 110 may include a remote participant 105 that desires to participate in a venue event in a more immersive manner. As shown, the remote participant 105 is using a ticketing application on their wireless device 115 to connect provide information to systems support the venue. As shown, the remote studio 110 optionally includes a video camera 118, and a display 120. The video camera 118 can be used to provide video imagery into the venue, and the display 120 can be used to render the broadcast of the event (e.g., sporting event, concert, a speech, a play, etc.). The video camera 118 may additionally or alternatively be used to capture the orientation and/or motion of the participant 105. For example, the video camera 118 may be a motion capture camera (e.g., having multiple lenses, an array of lenses, multiple separate camera components, etc.). As shown, the wireless device 115 interfaces with a home router 116, which provides wireless and wired connectivity for the home. The home router 116 may be a 5G capable device. That is, the home router 116 may be able to, for example, connect to the internet through a 5G mobile network.

As shown, the display 120 also interfaces with the home router 116, which may interface through one or more intermediary systems (e.g., a set top box that is not shown) in order to provide the video rendering of the event. In one example, the wireless device 115 may separately provide audio and/or a virtual experience to provide an enhanced experience. For example, the wireless device 115 may provide local audio for the remote participant 105, which is then processed and routed into the venue. The camera 118 may also be integrated into the wireless device 115. That is, for example, a front-facing camera of the wireless device 115 may be used to capture video data of the remote participant in order to provide video imagery into the venue. Similarly, a display of the wireless device 115 can be used in place of (or in addition to) the display 120. The display of the wireless device 115 can be used to, for example, render the broadcast of the event (e.g., sporting event, concert, etc.).

The wireless device 115 may be a mobile device, such as a smart phone, a laptop computer, a tablet, a virtual reality headset, a virtual reality headset with an integrated smart phone, etc. The wireless device 115 may be a 5G capable device, e.g., having a 5G capable integrated antenna array and modem and that is able to connect to a 5G mobile network. Additionally or alternatively, the wireless device 115 may be capable of taking advantage of a 5G mobile network (e.g., obtain some of the latency benefits provided by a 5G mobile network) indirectly using the home router 116 in cases where the home router 116 is a 5G capable device that can connect to a 5G mobile network.

In another configuration, the wireless device 115 works with an A/V receiver, local computer, audio support system (e.g., a "sound bar"), to provide an enhanced experience. For example, a local computer may use microphones embedded in the wireless device 115, display 120, and sound bar in order to provide a superior audio signal that better isolates and filters the source audio of the remote participant 105. For example, a receiver may implement one or more DSPs (Digital Signal Processors) in order to filter out playback of the venue noise being rendered by a sound bar. Thus, the audio data sent to the mixer would represent a superior quality audio source suitable for mixing and rendering in the venue.

The remote studio 110 interfaces with network 125 through a mixer (not shown). The network 125 may be a cellular network, such as a 5G mobile network. Once audio data from the user has been processed, a venue signal can be played into the venue 121. A shown, the venue features a basketball venue. Behind the scorer's table, there are three audio systems, 130, 135, and 140, that are used to provide some instantiation of the audio data from the remote participant 105. In one configuration, each of audio systems 130, 135, and 140 represents audio unique to one remote participant. For example, each of the audio systems 130, 135, and 140 correspond to a particular seat in the venue. That is, each of the audio systems 130, 135, and 140 may be arranged in or in the vicinity of a particular seat of the venue. In other configuration, the audio for audio system 130 may represent audio data from a logical arrangement of fans assigned to particular seats (or section). The mixer may attenuate and combine audio data from different users and send a combined signal to one or more of the speaker systems.

In some configurations, the audio systems cannot be located in the exact location associated with a user's assigned seat. Notwithstanding these differences, the signal may be transformed using, for example, a Fast Fourier Transform, that accounts for the actual location(s) of one or more audio systems used to render the audio signal in the venue. Thus, athletes may perceive audio for a particular user as originating from the second rote midcourt even though the speaker is located closer to the baseline.

The venue may include anyone of various types of locations or properties where an event may be hosted. For example, the venue may be a concert hall, a stadium, an arena, a pavilion, a conference center, a community center, a club, a bar, a restaurant, an art gallery, etc. Similarly, the events that the participant 105 may reserve a virtual seat for can include a variety of different events (e.g., performances), such as sporting events, gaming events such as card games, concerts, plays, operas, speeches such as political speeches, charity events, magic shows, talent shows, etc.

Figure 2:
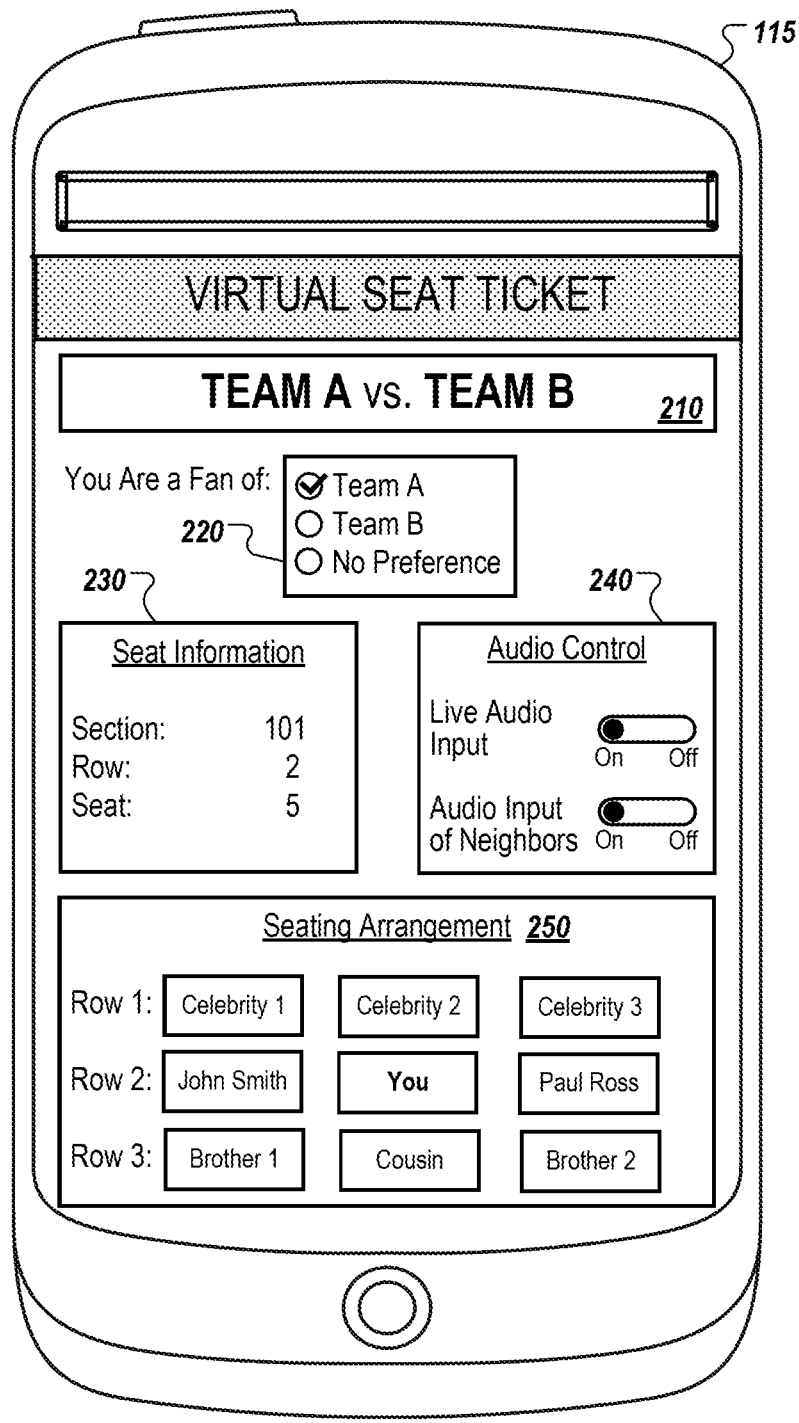
FIG. 2 is an example user interface showing a virtual seat application.

FIG. 2 is an example user interface 200 showing a virtual seat application. The UI 200 may be presented on the wireless device 115 shown in FIG. 1. The UI 200 includes an event identifier 210, a fan preference identifier 220, a virtual seat identifier 230, an audio control 240, and a seating arrangement 250. Generally, the virtual seat application is an application resident on a computer application, such as a wireless phone, that transports remote information (e.g., remote audio) to a venue using a mixer. The virtual seat application may require a registration and login process to ensure that a user is authenticated, and to manage the allocation of a limited number of virtual seats. For example, it may result in a bad experience or reproduction if too many users are allowed to virtually occupy the same virtual seat. A remote participant will want to know that their voice (and antics) may be uniquely identifiable for the participants. Thus, a system administrator may limit the density of fans and/or the number of active participants for a given region or location.

The event identifier 210 allows the user to select from one of several events (e.g., sports games, concerts, speeches, charity events, etc.). A system administrator may limit the remote participant to those that are licensed ticket holders, or the system administrator may allow others to purchase a virtual set for an event. For example, a system administrator may be trying to maintain social distancing guidelines and limit the virtual ticket applications to those that were otherwise set to attend the event. In some cases, a system administrator may allow family members, or a social network of a designated number of individuals to have a threshold amount of "audio presence" in a designated geographically-limited "virtual" area of the venue, such as if five people were occupying the space of three seats.

The fan preference identifier 220 may allow a user to declare their team preference. With their team preference, a broadcaster or the team itself may favor certain audio feeds while discouraging or diminishing the impact of adverse fans.

The virtual seat identifier 230 allows the user to perceive their virtual presence in the venue. This ability to secure a virtual seat identifier may secure a stronger presence as it relates to any audio data being broadcast from that location. For example, the user with a closer seat may receive a higher volume setting in the venue signal than those that are more distant from the floor (or area of interest). The virtual seat identifier also may be used to identify which speaker systems are used to broadcast the user's event (e.g., game as shown).

Audio control 240 is used to provide a degree of control as to whether their audio is broadcast. For example, a user may elect to conduct other business during the event (e.g., during the game) and not wish to share audio from these other conversations (e.g., a parent dealing with disciplinary issues). Similarly, the user may selectively allow whether they want to hear their neighbors, i.e., audio from other remote participants that are siting proximate to the remote participant in question. Some neighbors can be quite entertaining while others may be more annoying. The ability to block or attenuate this volume may allow the user to carve out their own experience.

Seating arrangement 250 may allow a user to design their own audio (and video) experience. For example, as shown the user is sitting in a second row behind three celebrities. The user is sitting between two friends, John Smith, and Paul Ross. In addition, two brothers and cousins are sitting behind the user. Seating arrangement may feature drag-and-drop functionality so that a remote participant (e.g., a user) can readily control which audio is locally played in the user's room. The arrangement of users also may be used to specify a directional control to reflect the virtual seat assignment. That is, users sitting to the left are perceived as speaking from the left hand side.

Figure 3:
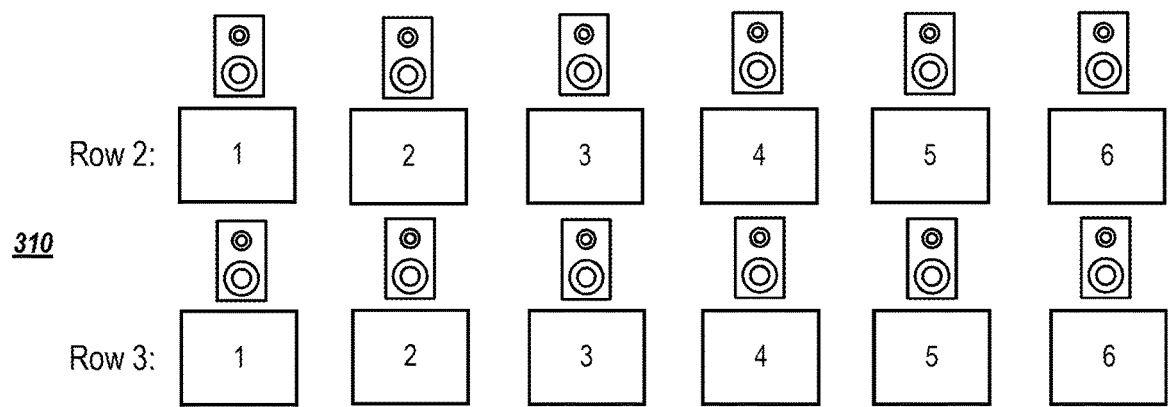
FIG. 3 is an example diagram showing multiple seat configurations for a distributed audio system.
Figure 3:
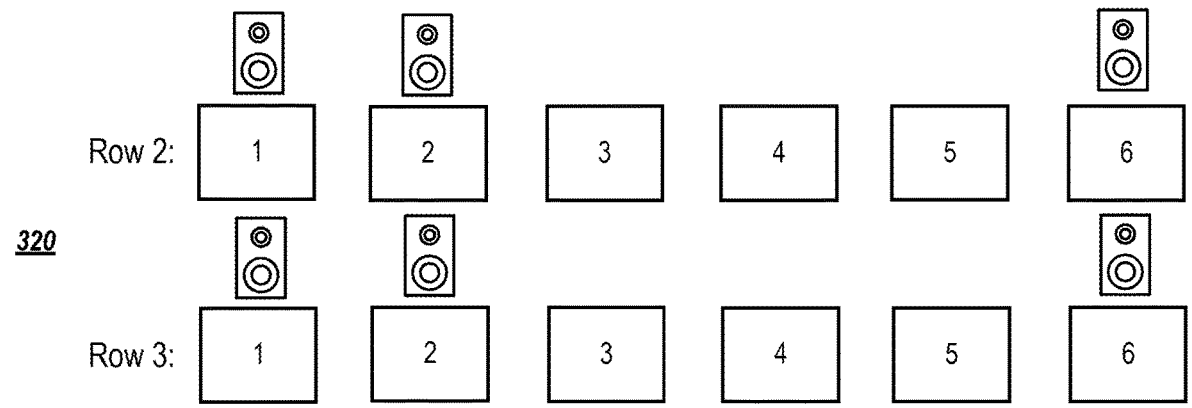

FIG. 3 is an example diagram 300 showing multiple seat configurations for a distributed audio system. The diagram 300 includes a first seat configuration 310 and a second seat configuration 320. In configuration 310, every seat has an audio system. For convenience of attending fans, (or to better mimic actual virtual fans), each virtual seat application may be linked to a particular audio system. The audio systems may represent a powered speaker temporarily moved into an assigned seat. Alternatively, each seat may include an audio system with appropriate safety settings. During some events, the audio systems can be used to provide guest amenities (e.g., a concierge service). When the seat is not occupied during an event, the power settings may be elevated so that a remote participant can enthusiastically support their team. Configuration 320 illustrates a setting where some seats have their own audio system, while other seats are forced to share an audio system. The mixer may modify the venue signal so that the audio is perceived as originating from one of the empty seats.

Figure 4:
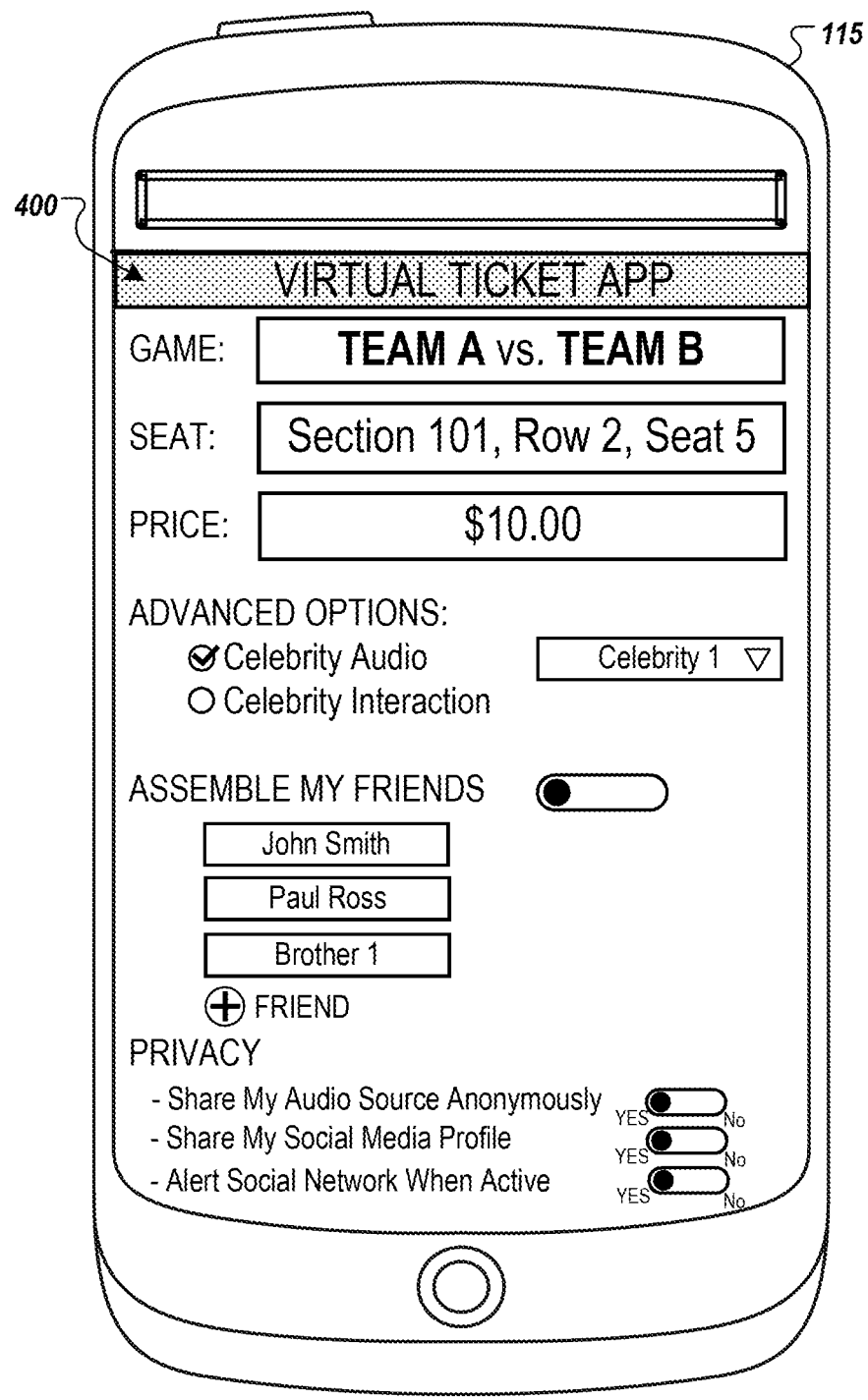
FIG. 4 is an example user interface illustrating how a user may adjust their virtual experience.

FIG. 4 is an example user interface 400 that illustrates how a user may adjust their virtual experience. For example, through the UI 400 a user may modify and adjust their social network in order to create their desired event experience (e.g., game day experience). The UI 400 may be displayed on the wireless device 115 shown in FIG. 1. As shown, the user first identifies the event (e.g., game), the seat, and the price of attending the event. The user has elected to participate alongside an identified media profile, which in this case is CELEBRITY1. As a result of this option, the user may be allowed to hear commentary and enthusiasm from the identified celebrity. In one setting, the user is limited to listen-only mode so that the user cannot interfere with the celebrity's enjoyment of the event. In another, perhaps premium setting, the user is afforded a capability to interact with the celebrity by allowing the user to ask questions (or share questions via chat). This may be a premium feature for those users that paid for this capability.

The user has assembled a network of friends that are invited to participate in the event. In one configuration, the user purchases the right for friends to participate with the user. In another configuration, the user designating friends merely invites the other users to purchase a virtual seat alongside the inviting user.

For example, the user may allow their audio to be sourced anonymously. In another setting, the user allows their social media profile to be shared. In still another setting, the user may be alerted when their participation in the virtual rendering of their event is recognized. In this manner, users can build their own following through enthusiasm and insight while also sharing the experience with friends.

Figure 5:
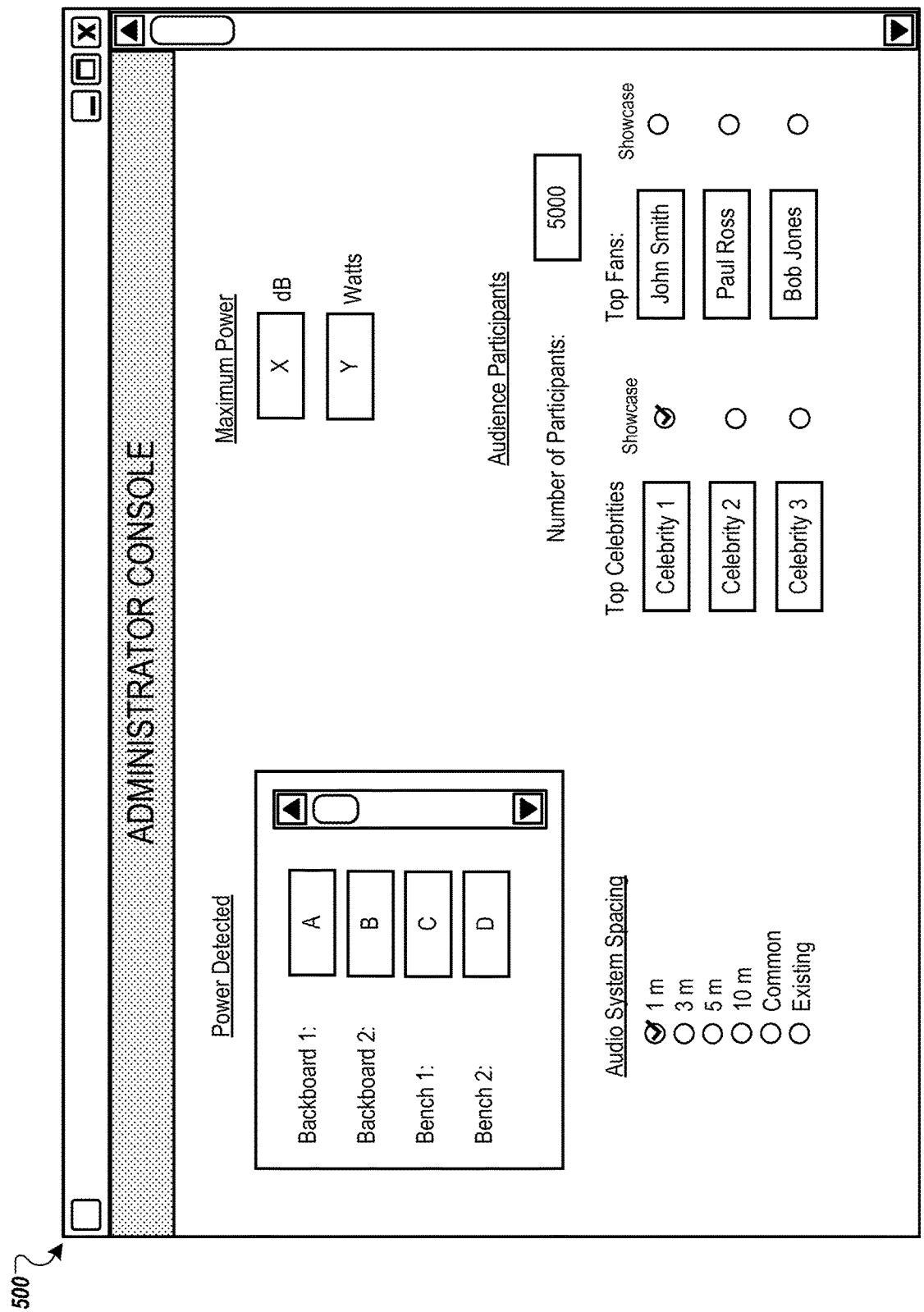
FIG. 5 is an example user interface for an administrator of a distributed audio system.

FIG. 5 is an example user interface 500 for an administrator of a distributed audio system. As shown the user (e.g., an administrator) can identify through the UI 500 which audio systems are used at which locations. Power settings can be specified, monitored, and managed so that the venue experience remains safe and/or enjoyable for participants. Thus, a user exerting high volume settings at home may be individually limited from raising the venue volume to unsafe levels. The power settings may be set at a specified decibel level and/or watt setting.

The administrator also is configured to selectively invoke spacing for underlying speakers. For example, the administrator may have access to speakers at designated distances (e.g., 1M, 3M, 5M, 10M, common speakers, and existing speaker systems). A 1M spacing may ensure that a dense configuration of speakers is employed to broadcast audio from remote participants. Common audio settings may transition to an expert or self-diagnostic setting that does not require an administrator to have a detailed understanding of the speaker system topology.

The administrator may limit the number of participants that are allowed to participate, that is, provide audio to the venue. The administrator may specify the number, which in turn propagates a listing of which seats are available. If the administrator reduces the number of seats from 5,000 virtual participants to 2,500 participants, a master ticketing application may eliminate every other seat, or eliminate 2,500 of the most distant seats.

The administrator also provides visibility into which celebrities are active and also identify which "casual" or non-celebrity fans are active. The user then can select a "showcase" button to commit more prominence for the showcased profile. For example, if the administrator selects the showcase button for CELEBRITY1, the audio for the announcers may be subdued while the audio levels for the CELEBRITY may be increased. Similarly, the administrator may elect to showcase active fans during breaks in the action through this same control. "Top" designation may be determined by the number of followers during particular event, the number of endorsements of the commentary, the number of times at which the mixer determines that the remote participant is active and/or the ambient volume level for the remote participant due to the remote participant's own cheering.

Figure 6:
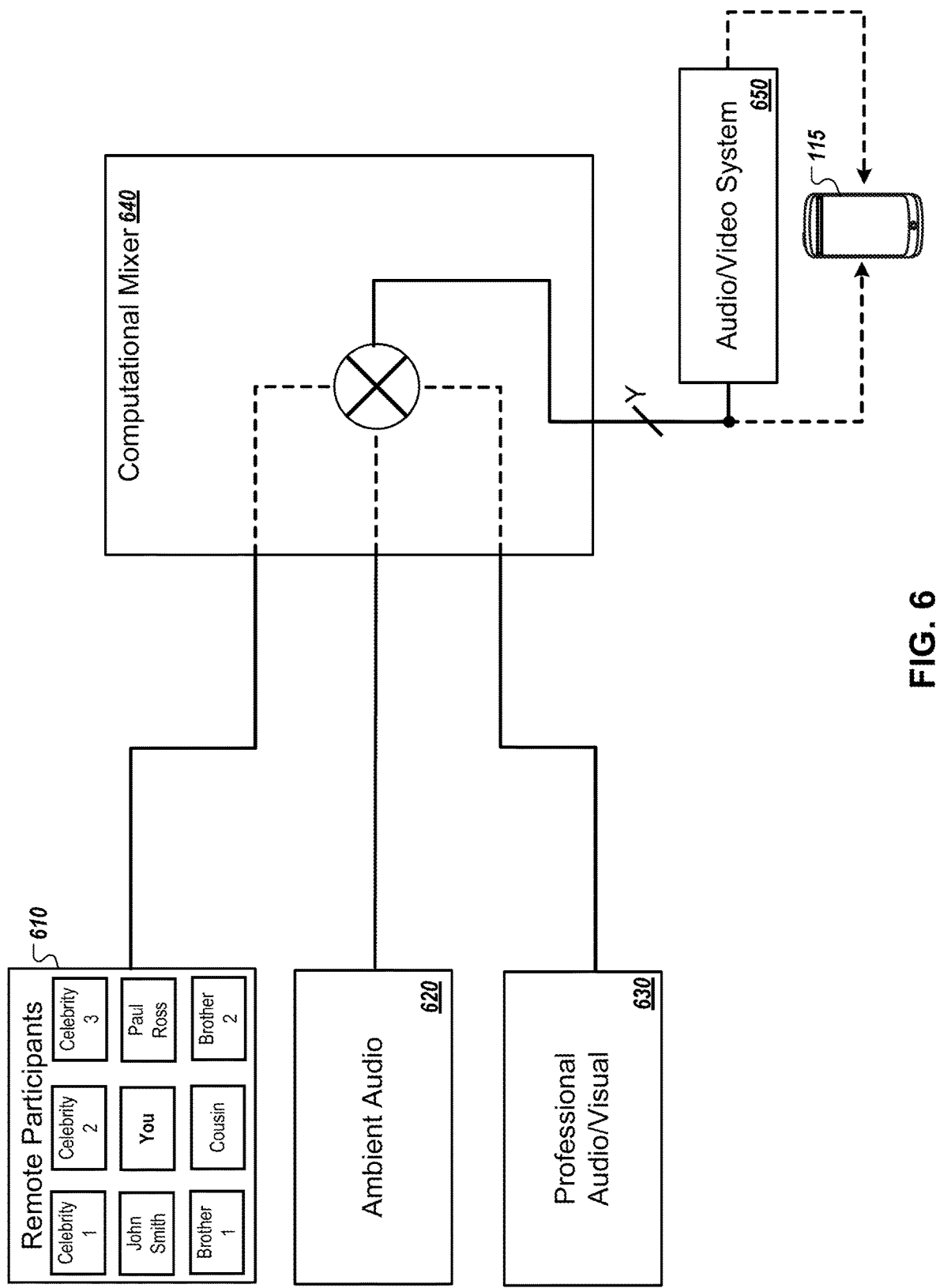
FIG. 6 is a diagram that illustrates an example mixer having multiple sources.

FIG. 6 is a diagram that illustrates an example mixer 600 having multiple sources. Mixer 600 includes audio data for a remote participants 610. Generally, these are users using a virtual ticket selector application that have opted to route their audio into the venue. Ambient audio source 620 provides the ambient audio for the venue. This may include audio from microphones located throughout a venue. Professional audio/video source 630 may include audio and/or visual material that represents video and commentary that represents the primary broadcast materials.

Within mixer 600, computational mixer 640 algorithmically mixes the different sources of data to provide the desired experience. For example, the computational mixer 640 may determine that 70% of the existing audio should remain unchanged. 30% of the audio should be added from the remote audio participants that are within three seats of the user's selected seat. The seat directly next to the identified seat may receive a weighting (mix) of 15, while those seats that are within two seats may receive a weighing or mix of (10), and those that are three seats away receive a mix of 5. This may include power allocations of 15%, 10%, and 5%. This can then be routed to the audio system of the remote participant in question.

As shown by multiple lines of communication, a venue signal is routed to the venue audio/video system 650 so that it can be rendered in the venue. In one configuration, the mixer combines several different audio sources at equal levels and routes them to a designated audio system in the venue audio system. In another configuration, a time-based scheme is used so that different users receive prioritized rendering. This may increase the intelligibility of the underlying audio in the venue so that users are not contending with one another to be understood. For example, the computational mixer 640 may use one serve process to integrate 10 sources for one speaker. Nine of the sources may be combined for 15% of the audio energy. The computational mixer may alternate between the 10 audio sources (or alternate between those active audio sources) to provide 85% of the available audio energy to that prioritized audio resource. Users may receive an alert in their virtual ticket application to perceive when their audio data is receiving prioritization.

Generally, the computational mixer 640 may be implemented on an array or collection of one or more processors configured to receive a stream of audio data from remote participants (e.g., TCP/IP audio data). The computational mixer 640 may provide each audio stream a threshold commitment computational processing. As the number of streams grows larger, the computational mixer 640 may spawn additional processes and/or access additional processes in order to ensure that the audio data is being processed in an appropriate manner.

The computational mixer 640 may include an audio mixer and/or a video mixer. Accordingly, in addition to receiving a stream of audio data from remote participants (e.g., TCP/IP audio data), the computational mixer 640 may optionally receive a stream of video data from the remote participants (e.g., from a front facing camera of the wireless device 115 shown in FIG. 1). The computational mixer 640 may also receive other data, such as sensor data indicating motion of and/or an orientation of the participants (e.g., looking up, looking down, looking left, looking right, standing up, sitting down, hands up, hands down, thumbs up, etc.). The sensor data may be obtained from one more or motion capture devices, such as a motion capture camera (e.g., the camera 118) in the studio 110, accelerometers in the wireless device 115, one or more IMUS in the wireless device 115, a front facing camera of the wireless device 115, etc.

The computational mixer 640 may be able to manipulate audio and/or video data in real-time or substantially real-time (e.g., near real-time). For example, the computational mixer 640 may be able to manipulate audio and/or video data in real-time or substantially real-time to provide a virtual reality or augmented reality to event participants. That is, the computational mixer 640 may be able to, for example, synchronize live video of various remote participants and live video of the event (e.g., obtained from a professional stream of the event, or from a camera setup at or near a particular seat of the venue that the corresponding participant has virtually reserved) with a real-time or substantially real-time video game engine to provide the virtual reality or augmented reality. Specifically, the computational mixer 640 may interface audio transmissions of the participants, video transmissions of the participants, and/or other audio and/or video transmissions (e.g., video and/or audio data of the event such as the professional audio/visual source 630 and/or the ambient audio source 620) with virtual reality graphics from a game engine, and proceed to composite the transmissions together in real-time or substantially real-time. The resulting composite may then be fed to the participants.

The composite generated may be particular to a specific participant, or a specific group of participants (e.g., those in the same section, part of the same group, etc.). For example, the composite generated may include a composite video stream that includes a model for the participant and models for neighboring participants (e.g., participants that have reserved virtual seats that neighbor the participant's virtual seat).

In providing the virtual reality or augmented reality environment, the computational mixer 640 may generate 3D models for various participants and/or objects in real-time or substantially real-time. That is, the computational mixer 640 may generate a model for a particular participant on the fly, e.g., using one or more video transmissions from the participant. Alternatively, the computational mixer 640 may update existing 3D models for various participants and/or objects in real-time or substantially real-time. For example, the computational mixer 640 may update the facial expressions for an existing model for a particular participant on the fly, e.g., using a video stream from a front-facing camera of the wireless device 115. The computational mixer 640 may also update the motions and/or orientations of the model, e.g., using sensor data from one or more motion capture devices. The existing model for the participant 105 may be generated, for example, by the venue audio/video system 650 and/or by the computational mixer 640 using an obtained image of the participant 105 (e.g., from a social network that the participant 105 belongs to, from a profile image of the participant 105 that they provided when registering to use the virtual seat application shown in FIG. 2, FIG. 4, and FIG. 11).

In providing the virtual reality or augmented reality environment, the computational mixer 640 may align the various 3D models with the environment. For example, the computational mixer 640 may align each model of each participant with a particular seat in the venue.

In some cases, the computational mixer 640 may be part of cloud computing system and/or controlled through a cloud computing system.

In some cases, the computational mixer 640 is part of the venue audio/video system 650.

As an example, the computational mixer 640 may mix a section of virtual seats to provide 20% of the venue signal that will be sent to a designated speaker. The most active remote participant then may be allocated 80% of the venue signal. Designation as the most active remote participant may be identified based on the most frequent audio transmission level detected on a microphone, for example, or based on greatest detected volume.

In some cases, the computational mixer 640 generates multiple different venue signals, e.g., for the particular speaker or group of speakers that are meant to output the corresponding signal. For example, the computational mixer 640 may mix the audio/video data differently for the particular seat and/or section of seats (e.g., based on the location of a user's their virtual seat in the venue, based on the location of a user's virtual seat with respect to other users, based on the user paying to hear or communicate with celebrities, etc.). Accordingly, the computational mixer 640 may generate multiple, different venue signals that are streamed/transmitted to the audio/video system 650.

In response to receiving the venue signal, the venue audio/video system 650 can output the venue signal over one or more speakers in the venue. For example, the audio/video system 650 can output the venue signal over one or more of the multiple seat speakers shown in FIG. 3 that each correspond to a particular seat in the venue. The venue signal output by the computational mixer 640 may be streamed/transmitted over a 5G mobile network.

In some cases, the venue signal is transmitted to and/or accessed by the wireless device 115. For example, the venue signal can be received at the wireless device 115 over a 5G network. The wireless device 115 may then output video data using a display of the device, and/or audio data using a speaker of the device (or an audio device, such as a speaker or headphones, connected to the device over a wired connection such as an auxiliary port, a Bluetooth connection, etc.).

In some cases, the audio/video system 650 outputs a signal (e.g., an audio/video signal). This signal may be transmitted to and/or accessed by the wireless device 115.

Figure 7:
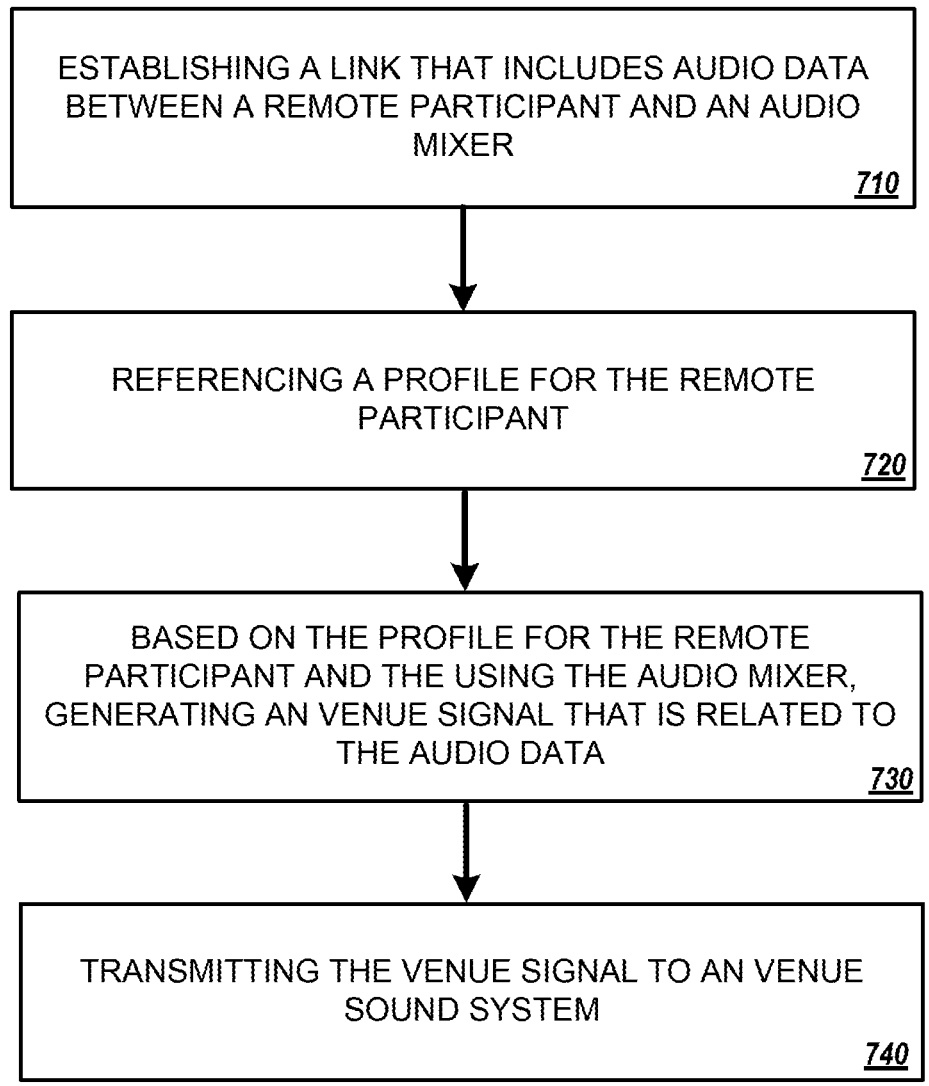
FIG. 7 is a flowchart of an example process for using a distributed audio system.

FIG. 7 is a flow chart of the process by which a system enables an audio system to provide audio from distributed sources into a venue. Initially, the system establishes a link that includes audio data between a remote participant and an audio mixer (710). This may include, for example, establishing a TCP/IP link (or similar network protocol link) with audio data from a wireless device and a server being used to mix data for the user's home. Similarly, this may include, for example establishing a low latency network protocol link with audio data and/or video data from a wireless device and a server used to mix data for the user's devices (e.g., virtual reality headset). The system references a profile for the remote participant (720). The profile may include a user identity, events that the user has registered for (e.g., reserved a virtual seat for), a virtual seat identifier and/or an indication of how the audio data and/or video data should be modified or mixed before sending on as a venue signal.

Based on the profile for the remote participant and using the audio mixer, a venue signal is generated that is related to the audio data (730). For example, the audio mixer may mix a section of virtual seats to provide 20% of the venue signal that will be sent to a designated speaker. The most active remote participant then may be allocated 80% of the venue signal. Designation as the most active remote participant may be identified based on the most frequent audio transmission level detected on a microphone, for example, or based on greatest detected volume.

In some cases multiple different venue signals are generated by the computational mixer 640, e.g., for the particular speaker or group of speakers that are meant to output the venue signal. For example, the computational mixer 640 may mix the audio/video data differently for the particular seat and/or section of seats (e.g., based on the location of a user's virtual seat in the venue, based on the location of a user's virtual seat with respect to other users, based on the user paying to hear or communicate with celebrities, etc.). Accordingly, the mixer 640 may generate multiple, different venue signals that are streamed/transmitted to the audio/video system 650.

A venue sound system to access the venue signal (740). For example, the generated venue signal can be transmitted to the venue sounds system, such as the audio/video system 650 shown in FIG. 6. In response to receiving the venue signal, the venue audio/video system 650 can output the venue signal over one or more speakers in the venue. For example, the audio/video system 650 can output the venue signal over one or more of the multiple seat speakers shown in FIG. 3 that each correspond to a particular seat in the venue. The venue signal output by the computational mixer 640 may be streamed/transmitted over a 5G mobile network.

In some cases, the venue signal is transmitted to and/or accessed by a user device. For example, the venue signal can be received at a user device. The user device may then output a video data using a display of the device, and/or audio data using a speaker of the device (or an audio device, such as a speaker or headphones, connected to the device over a wired connection such as an auxiliary port, a Bluetooth connection, etc.). The user device may receive/access the venue signal over a 5G mobile network, which can provide low latency and other transmission benefits that would allow the user to seamlessly enjoy the virtual experience (e.g., watch the event, interact with virtual seat neighbors, hear celebrities, interact with celebrities, etc.) in substantially real-time with no or substantially no perceivable lag (e.g., a latency less than 50 ms).

Figure 8:
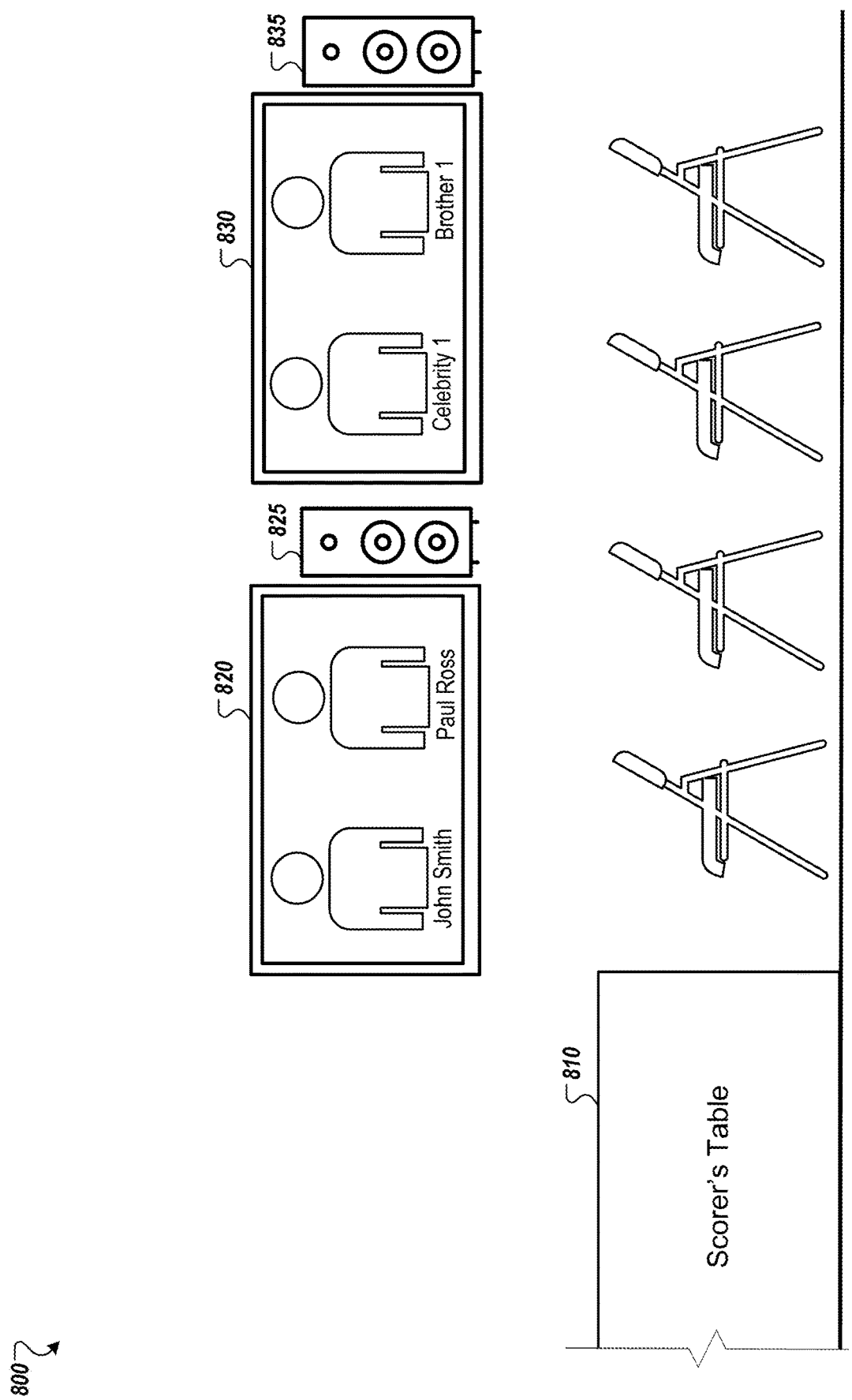
FIG. 8 is a diagram that illustrates an example venue configuration illustrating how a mixer may be used to provide a visual rendering of the remote participants.

FIG. 8 is a diagram showing an example venue configuration 800 illustrating how a mixer may be used to provide a visual rendering of the remote participants at an event. For example, as shown, the configuration 800 illustrates how a mixer (e.g., the computational mixer 640 shown in FIG. 6) may be used to provide a visual rending of the remote participants behind a scorer's table 810 in a basketball game. As noted above with respect to FIG. 1, a remote participant may have the ability to source video data from a camera located on a wireless device (e.g., the wireless device 115), embedded in a display or laptop, a web camera, or perhaps in someone household appliance (e.g., a Portal or other intelligent appliance).

The venue configuration 800 reveals displays 820 and 830 designed to provide the players with a visual representation of the remote participation. Each of the displays is associated with an audio system. Together, a visual and audio wall of participation may be rendered that enhances the player experience.

As shown, display 820 features John Smith and Paul Ross. Display 830 features CELEBRITY1 and the user's brother. The seating configurations shown previously may be configured to drive a multi-unit display to present richer visual imagery to the players.

For example, the user may allow their audio to be sourced anonymously. In another setting, the user allows their social media profile to be shared. In still another setting, the user may be alerted when their participation in the virtual rendering of their event is recognized. In this manner, users can build their own following through enthusiasm and insight while also sharing the experience with friends.

Figure 9A:
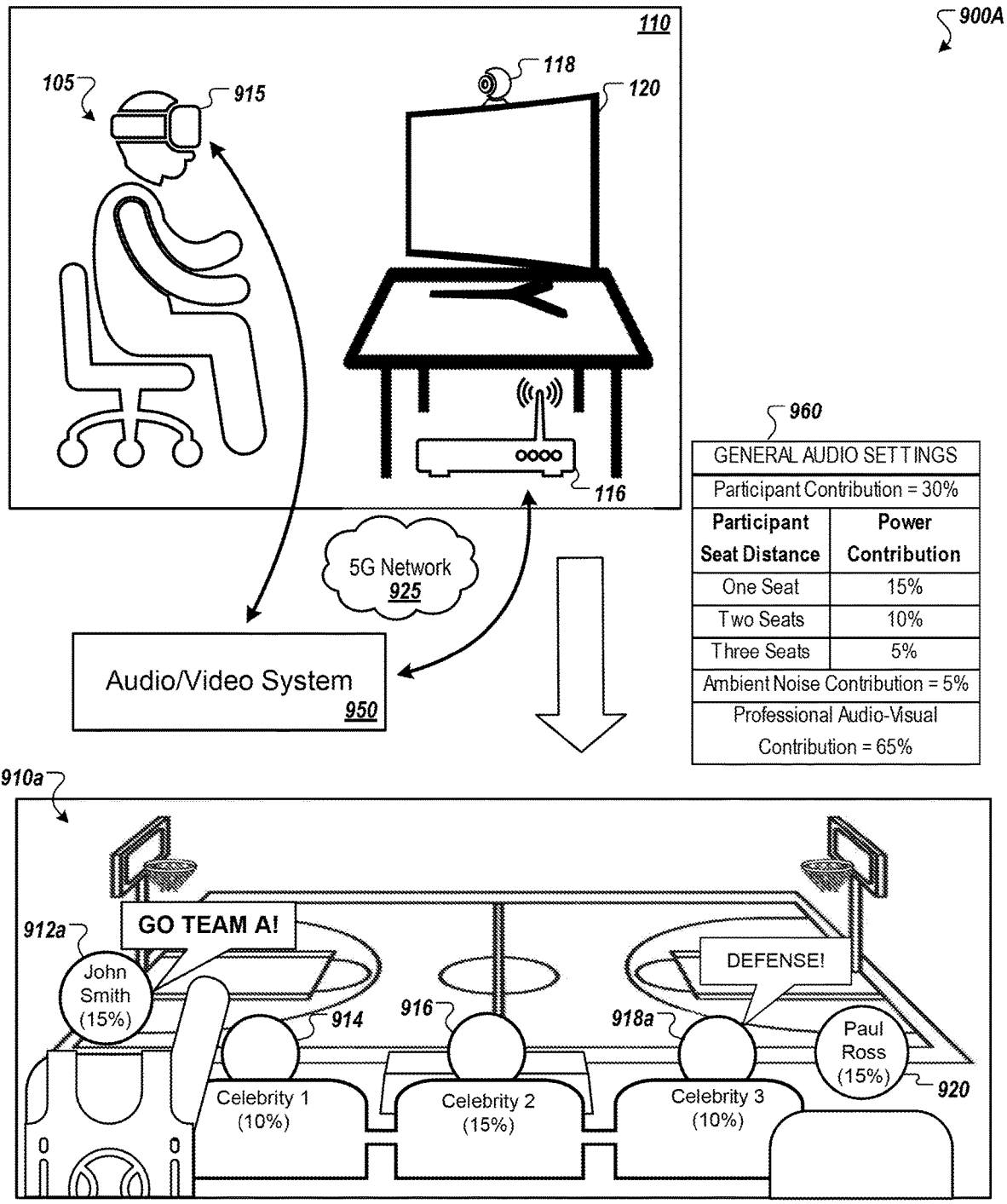
FIGS. 9A-9B are example logical diagrams of a distributed audio/video system.
Figure 9B:
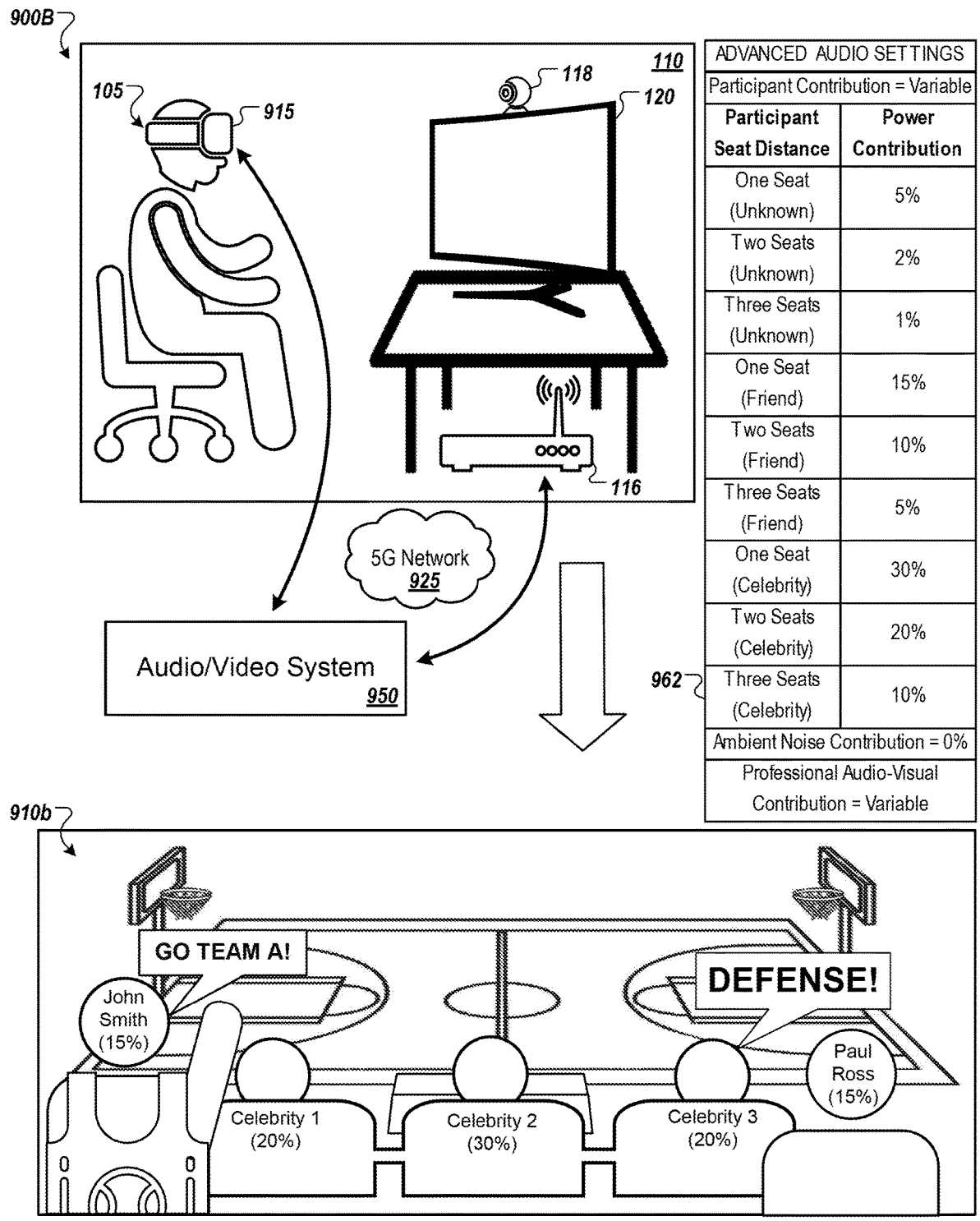
Figure 9C:
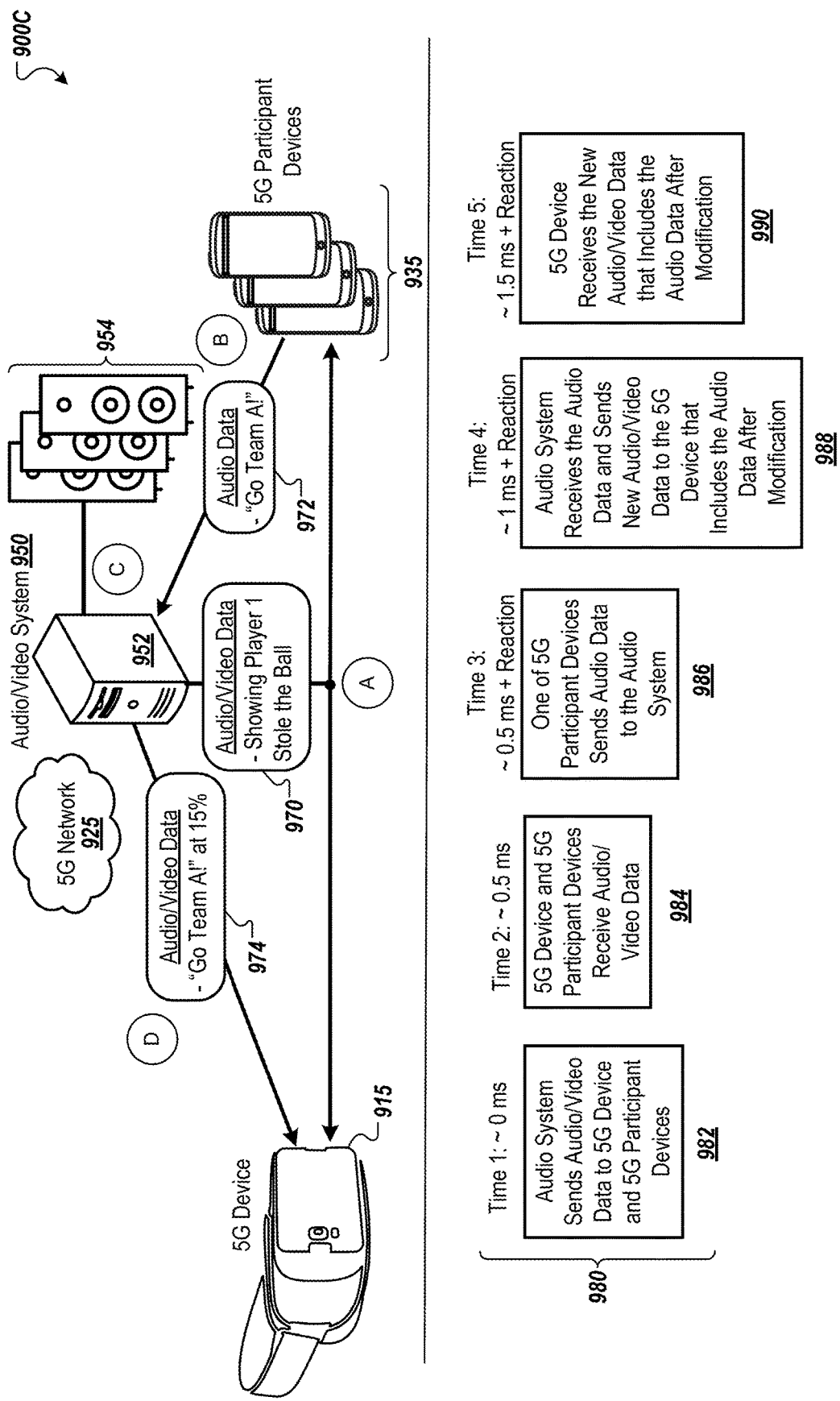
FIG. 9C is a diagram that illustrates an example distributed audio/video system using a 5G network.

FIGS. 9A-9C are example diagrams illustrating a distributed audio/video system 900. The distributed audio/video system 900 may include a venue audio/video system 950 and a 5G device 915 which can communicate over a 5G network 925 either directly (e.g., using a 5G capable integrated antenna array and modem) or indirectly (e.g., through the router 116 that may be a 5G capable device that can connect to the internet using the 5G network 925). The 5G network 925 may be a 5G cellular network. The distributed audio/video system 900 may further include a computational mixer, such as the computational mixer 640, to combine the audio and/or video data from multiple sources, including audio and/or video data from multiple participants that have reserved virtual seats in the venue, to generate one or more venue output signals. These one or more venue output signals may be fed back to the participants, and may include multiple different signals that are fed to different participants depending on their specific virtual seat, the section of a venue where the virtual seat is located, and/or the participant's audio settings or added features for the event (e.g., receiving audio data of coaches, celebrities, performers, etc.). The audio and/or video data fed back to the participants may be used to generate an augmented reality on an interface of the 5G device 915 that the participants can interact with to, for example, provide an in-person like experience during the event.

In some cases, the venue audio/video system 950 is the venue system 121 shown in FIG. 1. Similarly, the venue audio/video system 950 may be the venue audio/video system 650 shown in FIG. 6.

The 5G device 915 may be a mobile device, such as a smart phone, a laptop computer, a tablet, a virtual reality headset, etc. The 5G device 915 may be a 5G capable device, e.g., having a 5G capable integrated antenna array and modem and that is able to connect to the 5G mobile network 925. Additionally or alternatively, the 5G device 915 may be capable of taking advantage of a 5G mobile network (e.g., obtain some of the latency benefits provided by a 5G mobile network) indirectly using the home router 116 in cases where the home router 116 is a 5G capable device that can connect to the 5G mobile network 925.

In some cases, the 5G device 915 is the wireless device 115 shown in FIG. 1. FIG. 9A shows an example logical diagram of the distributed audio/video system 900A. As illustrated, the 5G device 915 may be able to communicate with the venue audio/video system 950 over the 5G network 925 directly or indirectly through the router 116. In using the 5G network 925 to communicate with the venue audio/video system 950, low latency (e.g., less than 50 ms, less than 30 ms, less than 20 ms, less than 10 ms, less than 4 ms, less than 2 ms, or less than or equal to 1ms) or very low latency (e.g., less than 10 ms, less than 4 ms, less than 2 ms, or less than or equal to 1ms) and other transmission benefits can be achieved that would allow the participant 105 to seamlessly enjoy the virtual experience (e.g., watch the event, interact with virtual seat neighbors, hear celebrities, interact with celebrities, etc.) in substantially real-time (e.g., near real-time) with no, or substantially no, perceivable lag. Moreover, in leveraging the transmission speeds of the 5G network other benefits can be afforded. For example, the distributed audio/video system 900A can take advantage of the 5G network 925 in order to generate and/or update a virtual reality or augmented reality on the fly with no, or substantially no, perceivable lag.

As an example, the venue audio/video system 950 may include a computational mixer (e.g., the computational mixer 640 shown in FIG. 6). Using the computational mixer (e.g., which may include an audio mixer and/or a video mixer), the venue audio/video system 950 can generate a composite using multiple data transmissions from remote participants, such as video transmission from the camera 118 and/or the wireless device 115, audio transmission from a the wireless device 115, IMU transmission from the wireless device 115, motion capture data from the camera 118, etc. Specifically, the venue audio/video system 950 may receive a stream of audio data and/or video data from the remote participants. The venue audio/video system 950 may also receive other data, such as sensor data indicating motion of and/or an orientation of the remote participants (e.g., sensor data that indicates whether the remote participants are looking up, looking down, looking left, looking right, standing up, sitting down, have their hands up, have their hands down, have their thumbs up, have their thumbs down, etc.). The sensor data may be obtained from one more or motion capture devices, such as a motion capture camera (e.g., the camera 118) in the studio 110, accelerometers in the 5G device 915, one or more IMUS in the 5G device 915, a front or back facing camera of the 5G device 915, etc.

The venue audio/video system 950 may be able to manipulate audio and/or video data in real-time or substantially real-time (e.g., near real-time), e.g., using the computational mixer. For example, the venue audio/video system 950 may be able to manipulate audio and/or video data in real-time or substantially real-time to provide a virtual reality or augmented reality to remote participants. Specifically, the venue audio/video system 950 may, for example, synchronize live video of various remote participants and live video of the event (e.g., obtained from a professional stream of the event, or from a camera setup at or near a particular seat of the venue that the corresponding participant has virtually reserved) with a real-time or substantially real-time video game engine to provide the virtual reality or augmented reality. In doing this, the venue audio/video system 950 (e.g., a computational mixer of the venue audio/video system 950) may interface audio transmissions of the participants, video transmissions of the participants, and/or other audio and/or video transmissions (e.g., video and/or audio data of the event, and/or the ambient audio generated by output of speakers placed in the venue such as by the speakers that are placed in the seats of the venue as demonstrated in FIG. 3) with virtual reality graphics from a game engine, and proceed to composite the transmissions together in real-time or substantially real-time. The resulting composite may then be fed to the participants.

The composite generated may be particular to a specific participant, or a specific group of participants (e.g., those in the same section, part of the same group, etc.). For example, the composite generated may include a composite video stream that includes a model for the participant 105 and models for the participant 105's neighboring participants (e.g., participants that have reserved virtual seats that neighbor the participant 105's virtual seat).

In providing the virtual reality or augmented reality environment, the venue audio/video system 950 (e.g., using the computational mixer) may generate 3D models for various participants and/or objects in real-time or substantially real-time. That is, for example, the venue audio/video system 950 may generate a model for the participant 105 on the fly (e.g., using one or more video transmissions from the 5G device 915 and/or from the camera 118). Alternatively, the venue audio/video system 950 may update existing 3D models for various participants and/or objects in real-time or substantially real-time. For example, the venue audio/video system 950 (e.g., using a computational mixer) may update the facial expressions for an existing model for the participant 105 on the fly, e.g., using a video stream from a front-facing camera of the wireless device 115 and/or the camera 118. The venue audio/video system 950 may also update the motions and/or orientations of the model, e.g., using sensor data from one or more motion capture devices. The existing model for the participant 105 may be generated, for example, by the venue audio/video system 950 using an obtained image of the participant 105 (e.g., from a social network that the participant 105 belongs to, from a profile image of the participant 105 that they provided when registering to use the virtual seat application shown in FIG. 2, FIG. 4, and FIG. 11).

In providing the virtual reality or augmented reality environment, the venue audio/video system 950 (e.g., using a computational mixer) may align the various 3D models with the environment (e.g., the venue, particular section of the venue, particular seat of the venue, particular group of seats of the venue, etc.). For example, the venue audio/video system 950 may align each model of each participant with a particular seat in the venue.

As illustrated in FIG. 9A, the resulting composite generated by the venue audio/video system 950 may be transmitted to the 5G device 915 over the 5G network 925, resulting in the participant 105 being presented the interface 910a on a display of the 5G device 915. As shown, the interface 910a is an augmented reality environment that includes video data of the actual venue where the corresponding event is taking place. As an example, the video data may be generated from a professional stream of the event and/or from a camera that is setup at or near the seat in the venue that the participant 105 reserved. The video data of the venue (e.g., from the perspective of the seat of the venue that the participant 105 reserved) may be augmented with 3D models of other remote participants that have reserved seats neighboring the participant 105's seat. For example, the interface 910a includes a first model 912a for a remote participant John Smith, a second model 914 for a remote participant Celebrity 1, a third model 916 for a remote participant Celebrity 2, a fourth model 918a for a remote Celebrity 3, and a fifth model 920 for a remote participant Paul Ross.

The 3D models provided in the composite (e.g., the augmented reality environment) may include the real-time or substantially real-time audio, motions, and/or appearances of the remote participants. For example, as shown, the model 912a shows that the remote participant John Smith is currently standing with one arm raised and yelling "Go Team A!" The orientation of the model 912a and the audio projected from the location of the model 912a may match the real-time or substantially real-time orientation and/or audio of the remote participant John Smith. For example, the audio/video system 950 may use motion capture data to determine that the remote participant John Smith is current standing with one armed raised and may use audio transmission from John Smith to determine that he is currently yelling "Go Team A!" Similarly, the audio/video system 950 may use audio data captured from the remote participant Celebrity 3 to include audio of "Defense!" to be included in the audio that the participant 105 hears and to assign the source of that specific audio to a location where the model 918a is located. As will be discussed in more detail below, the general audio settings 960 for the participant 105 indicate that the audio power contribution of the remote participant John Smith to the audio component of the composite is currently set to 15%.

In some cases, the 3D models include a depiction of a name or other identifier for the remote participants. The name may be an actual name for the participants, a first name for the participants (e.g., for privacy purposes), or a username or ID number for the participants (e.g., for privacy purposes). The participants themselves may be able to select whether they want their full name or only their first name displayed. Similarly, a participant may be able to select an option to not have their name displayed, in which case a username or other identifier may be assigned to the corresponding model. The name or identifier may be displayed as virtual text floating above the corresponding model, appearing on the corresponding model, or on a seat associated with the corresponding model. In some case, e.g., for sporting events or political speeches, in place of or in addition to the identifier, the models include an indication of the team or political party that the participant is supporting. This indication may be in the form of a jersey placed on the corresponding model (e.g., the model 912a may be generated to depict wearing a Team A jersey based on the statements by the remote participant John Smith, on a section of the venue that the corresponding seat is located in (e.g., home vs away section), based on a preference indicated by the remote participant John Smith when they reserved a ticket for their seat, etc.).

The general audio settings 960 depict the audio settings that are being used to generate the audio that is transmitted to the participant 105 (e.g., transmitted to the 5G device 915 and outputted through one or more speakers of the 5G device 915). That is, for example, the general audio settings 960 represent how a computational mixer (e.g., of the audio/video system 950) is combing different sources to generate the audio (and/or video) component of the composite sent to the 5G device 915 of the participant 105. The general audio settings 960 may represent default settings that may be modified, e.g., by the participant 105 as described in more detail below with respect to FIG. 9B. As shown, the audio component of the composite provided to the participant 105 is made up of 30% participant audio data (e.g., from other remote participants), 5% from ambient noise (e.g., from microphones located throughout a venue), and 65% from professional audiovisual contribution (e.g., audio and/or visual material that represents video and commentary that represents the primary broadcast materials, such as the audio of announcers, players, coaches, performers, etc.). Accordingly, most of what the participant 105 is hearing is coming from the professional audiovisual sources, followed by the sounds of other remote participants, and finally by the ambient noise in the venue. In more detail, the participant contribution is broken down further by seat distance from a seat of the participant 105. For example, remote participants that are one virtual seat away from the participant 105 contribute 15% to the audio component of the composite (e.g., such as the remote participants John Smith, Paul Ross, and Celebrity 2), whereas remote participants that are two virtual seats away contribute 10% (e.g., such as the remote participants Celebrity 1, and Celebrity 3) and remote participants that are three virtual seats away contribute only 5%. The general audio settings 960 may provide that remote participants that more than three virtual seats away from the participant 105's seat may be effectively muted with 0% contribution (though they may have an insignificant contribution through the ambient noise contribution and/or the professional audiovisual contribution).

The general audio settings 960 may be stored as part of a profile for the participant 105, e.g., on the venue audio/video system 950.

FIG. 9B shows an example logical diagram of the distributed audio/video system 900B. As illustrated, in place of the general audio settings 960 in FIG. 9A, advanced audio settings 962 are used.

The advanced audio settings 962 may allow the participant 105 (or an administrator) greater control over the audio that they receive (e.g., from a computation mixer of the audio/video system 950). As illustrated, the advanced audio settings 962 may allow the participant 105 (or an administrator) to control the audio contribution based on categories of other remote participants in addition to the virtual distance of those remote participants. For example, the participant 105 may be able to specify settings based on whether the remote participant is unknown, a friend, or a celebrity. Similarly, the participant 105 may be able to adjust audio settings based on whether a speaker is a performer, a coach, an announcer, etc. (e.g., as they may each have unique audiovisual sources). As shown, the participant 105 has configured the advanced audio settings 962 such that that the contributions of the celebrities are weighted more heavily than other remote participants.

As depicted in the interface 910b of the 5G device 915, the effect that the advanced audio settings 962 have on the participant 105's virtual experience include the audio of "Defense!" from the Celebrity 3 can be heard much loader and/or more clearly. This is because the advanced audio settings 962 provide that the contribution for the remote participant Celebrity 3 is 20% based on the remote participant Celebrity 3 being a celebrity and being two seats away from the seat of the participant 105.

In some cases, the advanced audio settings 962 may allow the participant 105 (or an administrator) to change the audio contribution for particular remote participants. For example, if the participant 105 does not want to hear anything from the remote participant John Smith, the participant 105 may be able to adjust the audio settings for the computation mixer of the audio/video system 950 to mute the remote participant John Smith. This option or similar options may be presented to the participant 105 in an audio setting interface on the display of the 5G device 915, e.g., as part of the virtual seat application.

The advanced audio settings 962 may be stored as part of a profile for the participant 105, e.g., on the venue audio/video system 950.

FIG. 9C is a diagram that illustrates an example distributed audio/video system 900C using a 5G network. The distributed audio/video system 900C includes the venue audio/video system 950, the 5G device 915 of the remote participant 105, and 5G devices 935 of other remote participants. The venue audio/video system 950, the 5G device 915, and 5G devices 935 may communicate over the 5G network 925. The venue audio/video system 950 includes a server 952 and multiple audio systems 954. The server 952 may store profiles for the remote participants (e.g., may create a profile for a participant when they register to reserve a virtual seat). The audio systems 954 may be, for example, the audio systems 130, 135, and 140 shown in FIG. 1. The audio systems 954 may include, for example, speakers that are assigned to individual seats in the venue, speakers that are assigned to a section of seats in the venue, speakers that are assigned to particular persons (e.g., announcers, coaches, performers, etc.). The server 952 may communicate with the audio systems 954 through a wired or a wireless connection. For example, the server 952 may communicate with the audio systems 954 through the 5G network 925.

FIG. 9C also illustrates a flow of data, shown as stages (A) to (D), with each representing a step in an example process. Stages (A) to (D) may occur in the illustrated sequence, or in a sequence that is different from the illustrated sequence. For example, some of the stages may occur concurrently. The stages (A) to (D) also correspond with a timeline 980 showing approximate times of different events occurring with respect to the flow of data.

In stage (A), the server 952 of the venue audio/video system 950 outputs audio/video data 970. The audio/video data may include, for example, video data showing that a player 1 in a game being played in the venue just stole the basketball. The audio/video data 970 may be transmitted over the 5G network to the 5G device 915 and the 5G devices 935. The transmission of the audio/video data 970 corresponds to a first time 982—of, for example, 0 ms—when the server 952 transmits the audio/video data 970 and a second time 984—of, for example, approximately 0.5 ms—when audio/video data 970 is received at the 5G device 915 and the 5G devices 935.

In stage (B), one or more of the 5G devices 535 transmit audio data 972 to the server 952. The audio data 972 may include, for example, the audio data of "Go Team A!" generated by a microphone of a 5G device belonging to the remote participant John Smith shown in FIGS. 9A-9B. The audio data 972 may be generated by the remote participant John Smith in response to seeing the player steal the basketball as shown in the audio/video data 970. The transmission of the audio data 972 may correspond to a third time 986—of, for example, approximately 0.5 ms plus the reaction time of the remote participant John Smith—when the audio data 972 is sent by one of the 5G devices 935 to the server 952 and a fourth time 988—of, for example, approximately 1 ms plus the reaction time of the remote participant John Smith—when the audio data 972 is received by the server 952.

In stage (C), the server 952 receives the audio data 972. The server 952 may use the audio data 972 along with other sources of audio data and/or video data to generate, for example, a composite audiovisual signal for the 5G device 915 and/or for one or more of the audio systems 954. The server 952 may do this in real-time or substantial real-time such that there is little if any significant delay. That is, the server 952 may use a computational mixer to combine the different and audio sources for the participant 105 in accordance with their audio settings (e.g., the general audio settings 960 shown in FIG. 9A or the advanced audio settings 962 shown in FIG. 9B) without significant processing time.

In stage (D), the server 952 sends audio/video data 974 to the 5G device 915. As shown, the audio/video data 974 may include the "Go Team A!" audio data of the audio data 972 but with its contribution (e.g., contribution to an audio component of a composite venue audiovisual signal) reduced to 15% by the server 952. The transmission of the audio/video data 974 may correspond to the fourth time 988—of, for example, approximately 1 ms plus the reaction time of the remote participant John Smith—when the audio data 974 is sent by the sever to the 5G device 915 and a fifth time 990—of, for example, approximately 1.5 ms plus the reaction time of the remote participant John Smith—when the audio data 974 is received by the server 952 over the 5G network 925.

As depicted, streaming the audio and/or video data of an event to multiple remote participants can be achieved with very low latency through the use of a 5G network. Accordingly, the distributed audio/video system 900C can provide a seamless virtual experience such that various remote participants can interact with each other and can react to the event itself without or substantially without any perceivable lag (e.g., of the game or of the reactions of other remote participants).

The times 982-990 in the timeline 980 may represent ideal times that can be achieved only using a 5G network. A 5G network may achieve times different than what is depicted in the example of FIG. 9C, however the times that can be achieved using a 5G network are significantly faster than what is possible using other cellular networks (e.g., 3G and 4G), and, thus, can be used to provide an environment with substantially reduced latency and an overall better virtual experience for the participants. In addition, although not shown, there may be processing times by the various devices of the distributed audio/video system 900C in extracting, loading, presenting, mixing, and/or packaging data (e.g., audio data, video data, etc.).

Although FIGS. 9A-9C are described above with respect to 5G mobile networks, different low latency technologies or technology standards may be used in place of a 5G mobile network. Such technologies or technology standards may still be in development but can be, upon release, implemented with the other disclosed teaching to realize the benefits described herein. For example, instead of using the 5G network 925, the distributed audio/video system 900 may use a 6G cellular over which a 6G enabled wireless device of the participant 105 can communicate with the venue audio/video system 950.

Figure 10A:
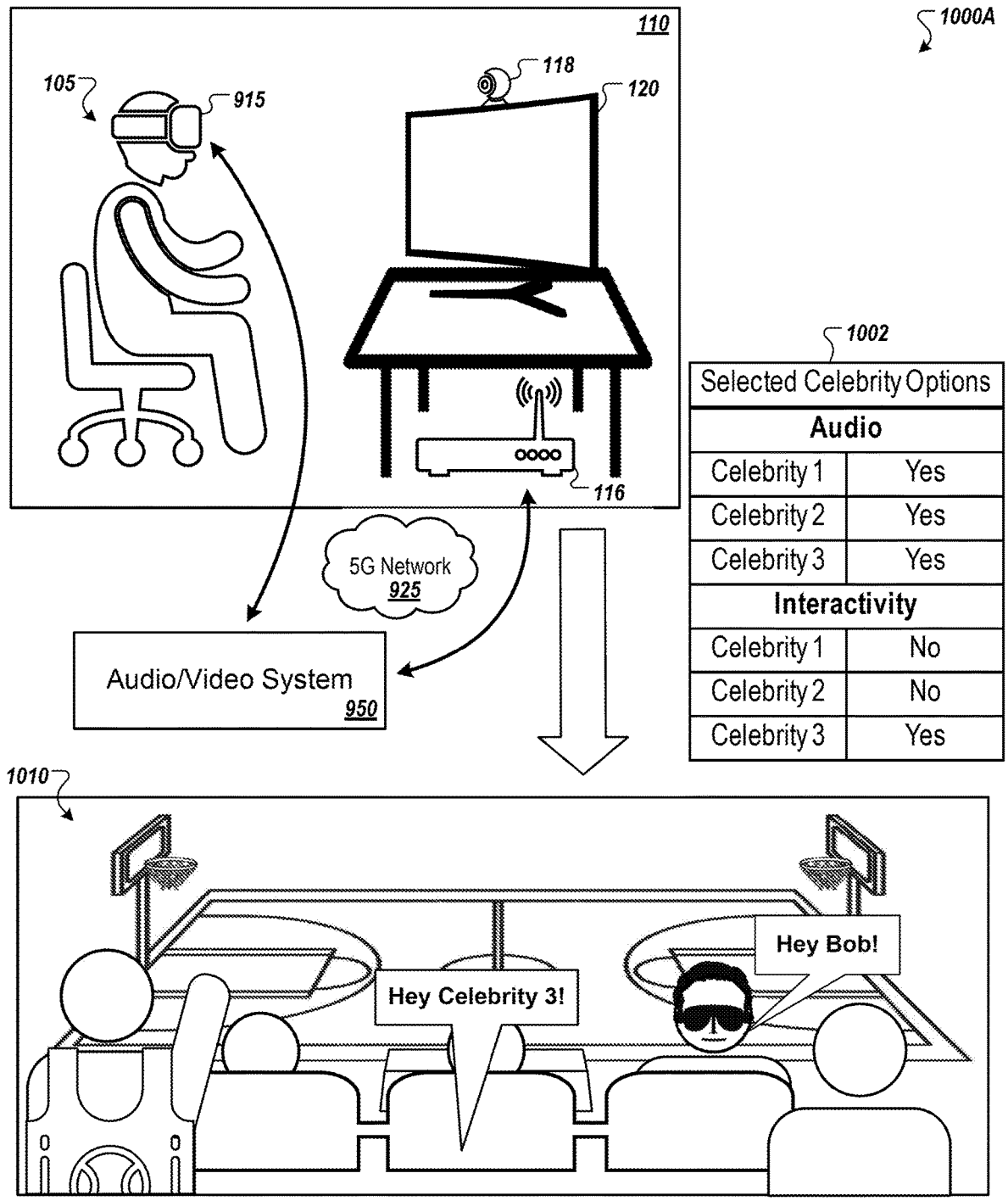
FIG. 10A is example logical diagrams of a distributed audio/video system.
Figure 10B:
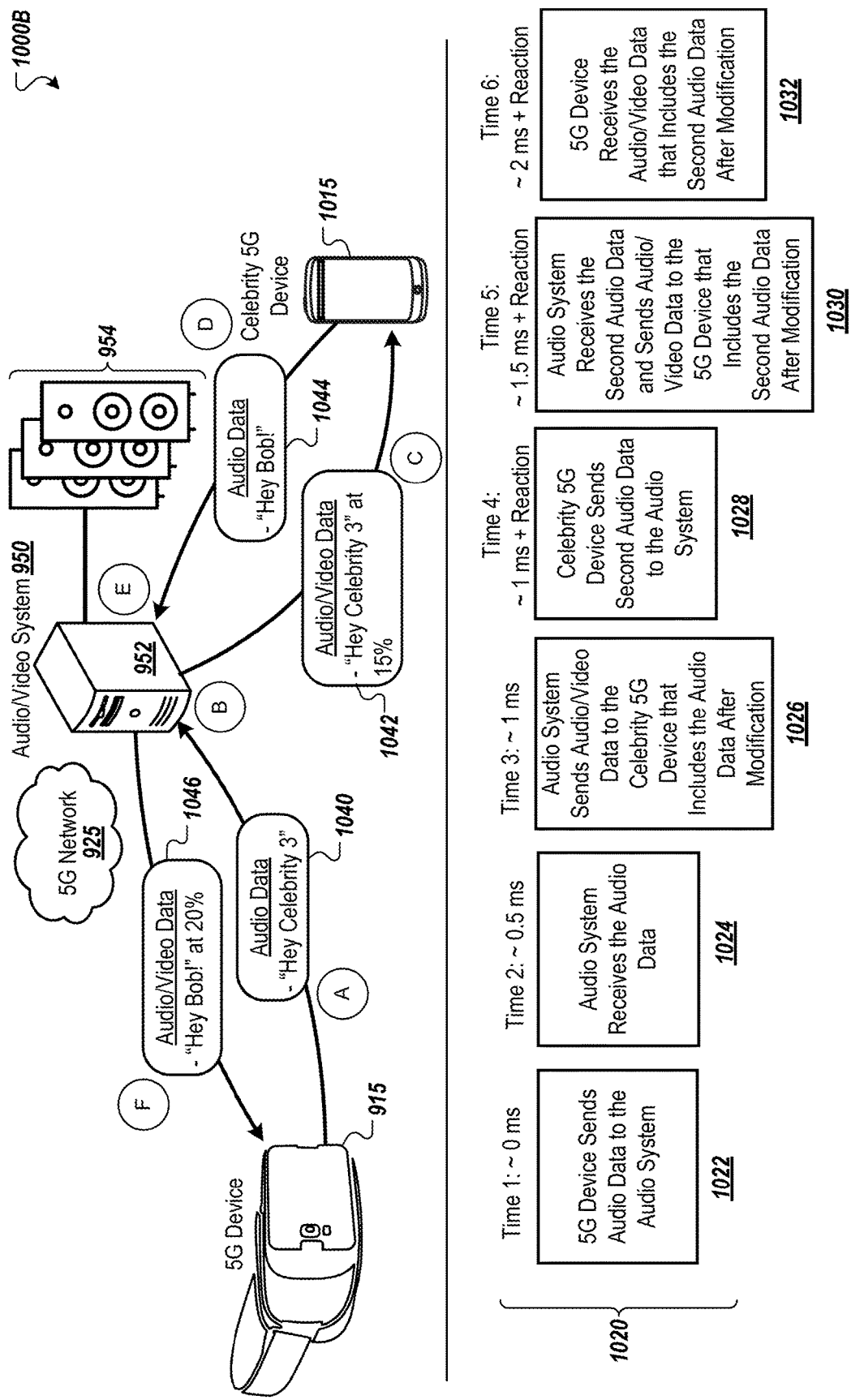
FIG. 10B a diagram that illustrates an example distributed audio/video system using a 5G network.

FIGS. 10A-10B are example diagrams illustrating a distributed audio/video system 1000. The distributed audio/video system 1000 may include the venue audio/video system 950 and the 5G device 915 which can communicate over the 5G network 925 either directly (e.g., using a 5G capable integrated antenna array and modem) or indirectly (e.g., through the router 116 that may be a 5G capable device that can connect to the internet using the 5G network 925). The 5G network 925 may be a 5G cellular network. The distributed audio/video system 1000 may further include a computational mixer, such as the computational mixer 640 shown in FIG. 6, to combine the audio and/or video data from multiple sources, including audio and/or video data from multiple participants that have reserved virtual seats in the venue, to generate one or more venue output signals. These one or more venue output signals may be fed back to the participants, and may include multiple different signals that are fed to different participants depending on their specific virtual seat, the section of a venue where the virtual seat is located, and/or the participant's audio settings or added features for the event (e.g., receiving audio data of coaches, celebrities, performers, etc.). The audio and/or video data fed back to the participants may be used to generate an augmented reality on an interface of the 5G device 915 that the participants can interact with to, for example, provide an in-person like experience during the event.

In some cases, the distributed audio/video system 1000 is the distributed audio/video system 900 shown in FIGS. 9A-9C.

FIG. 10A is example logical diagrams of a distributed audio/video system 1000. As illustrated, the 5G device 915 may be able to communicate with the venue audio/video system 950 over the 5G network 925 directly or indirectly through the router 116. In using the 5G network 925 to communicate with the venue audio/video system 950, low latency (e.g., less than 50 ms, less than 30 ms, less than 20 ms, less than 10 ms, less than 4 ms, less than 2 ms, or less than or equal to 1 ms) or very low latency (e.g., less than 10 ms, less than 4 ms, less than 2 ms, or less than or equal to 1 ms) and other transmission benefits can be achieved that would allow the participant 105 to seamlessly enjoy the virtual experience (e.g., watch the event, interact with virtual seat neighbors, hear celebrities, interact with celebrities, etc.) in substantially real-time (e.g., near real-time) with no, or substantially no, perceivable lag. Moreover, in leveraging the transmission speeds of the 5G network other benefits can be afforded. For example, the distributed audio/video system 900A can take advantage of the 5G network 925 in order to generate and/or update a virtual reality or augmented reality on the fly with no, or substantially no, perceivable lag.

As illustrated in FIG. 10A, remote participants may be able to view and/or modify celebrity options 1002. The celebrity options 1002 may have default values that can be customized for the particular remote participant (e.g., by the remote participants or based on information in a user profile for the remote participant). The celebrity options 1002 may be particular to a particular event, such that the participant 105 is presented the celebrity options 1002 after reserving a seat that is in the vicinity (e.g., within three seats of) of one or more celebrities. As shown, the celebrity options 1002 include an option to enable or disable (e.g., mute) individual celebrities having reserved seats neighboring the seat reserved by the participant 105. The celebrity options 1002 may also include an option to enable or disable interactivity between particular celebrities. Such an option may only be available to the participant 105 if, for example, a corresponding celebrity has agreed to interactivity (e.g., which would allow audio data generated by the participant 105 to be transmitted to the celebrity or transmitted to the celebrity with a contribution that is higher than what is typical per the audio settings of the celebrity, and/or higher than what is typical for contribution of other remote participants in the vicinity). Similarly, such an option may only be available to the participant 105 if they reserved such an option when they reserved their virtual seat.

The celebrity options 1002 provide that the audio data that the participant 105 receives from the venue audio/video system 950 does include the audio of all celebrities in the virtual vicinity of the participant. That is, for example, the audio component of a composite audiovisual signal outputted by a computation mixer of the venue audio/video system 950 will include detected audio generated by the remote participant Celebrity 1, the remote participant Celebrity 2, and the remote participant Celebrity 3. The celebrity options 1002 further provide that the participant 105 can currently interact with the remote participant Celebrity 3, but not the other two celebrities.

An example interaction between the participant 105 and the remote participant Celebrity 3 is depicted in the interface 1010 of the 5G device 915. Here, the participant 105 says "Hey Celebrity 3!" The audio/video system 950 may receive this audio data and send it (e.g., mixed along with other audiovisual data, but with a higher contribution per the celebrity options, such as 30% contribution to Celebrity 3 instead of a typical 10% for other nearby remote participants) to the remote participant Celebrity 3. Having received and heard this audio, Celebrity 3 responds to the participant 105, stating "Hey Bob!" Due to the low latency provided by the 5G network 925, this conversation between the participant 105 and Celebrity 3 can happen in real-time or substantially real-time.

The participant 105 may be able to update the celebrity options 1002 using the 5G device 915. For example, the participant 105 may access a celebrity options interface on the virtual seat application running on the wireless device (e.g., as depicted in FIG. 2).

The celebrity options 1002 may be stored as part of a profile for the participant 105, e.g., on the venue audio/video system 950.

FIG. 10B a diagram that illustrates an example distributed audio/video system 1000B using a 5G network. The distributed audio/video system 1000B includes the venue audio/video system 950, the 5G device 915 of the remote participant 105, and a celebrity 5G device 1015 of other remote participants. The venue audio/video system 950, the 5G device 915, and celebrity 5G device 1015 may communicate over the 5G network 925. The venue audio/video system 950 includes a server 952 and multiple audio systems 954. The audio systems 954 may be, for example, the audio systems 130, 135, and 140 shown in FIG. 1. The audio systems 954 may include, for example, speakers that are assigned to individual seats in the venue, speakers that are assigned to a section of seats in the venue, speakers that are assigned to particular persons (e.g., announcers, coaches, performers, etc.). The server 952 may communicate with the audio systems 954 through a wired or a wireless connection. For example, the server 952 may communicate with the audio systems 954 through the 5G network 925.

FIG. 10B also illustrates a flow of data, shown as stages (A) to (F), with each representing a step in an example process. Stages (A) to (F) may occur in the illustrated sequence, or in a sequence that is different from the illustrated sequence. For example, some of the stages may occur concurrently. The stages (A) to (F) also correspond with a timeline 1020 showing approximate times of different events occurring with respect to the flow of data.

In stage (A), the 5G device 915 outputs detected audio data 1040 and transmits it to the server 952 of the venue audio/video system 950 over the 5G network 925. As shown, the audio data 1040 includes the participant 105's greeting "Hey Celebrity 3." The transmission of the audio data 1040 corresponds to a first time 1022— of, for example, 0 ms—when the 5G device 915 sends the audio data 1040 to the server 952.

In stage (B), the server 952 receives the audio data 1040. The reception of the audio data 1040 corresponds to a second time 1022— of, for example, approximately 0.5 ms—when the server 952 receives the audio data 1040. After receiving the audio data 1040, the server 952 may use the audio data 1040 along with other sources of audio data and/or video data to generate, for example, a composite audiovisual signal for the celebrity 5G device 1015 and/or for one or more of the audio systems 954. The server 952 may do this in real-time or substantial real-time such that there is little if any significant delay. That is, the server 952 may use a computational mixer to combine the different and audio sources for the Celebrity 3 in accordance with their audio settings (e.g., the general audio settings 960 shown in FIG. 9A or the advanced audio settings 962 shown in FIG. 9B) and the celebrity options 1002 of the participant 105 without significant processing time. In some cases, such as depicted, there may be a slight delay in order to mix the multiple audio and/or video sources.

In stage (C), the server transmits audio/video data 1042 to the celebrity 5G device 1015 over the 5G network 925. The transmission of the audio/video data 1042 may correspond to a third time 1026— of, for example, approximately 1 ms—when the server 952 sends the audio/video data 1042 to the celebrity 5G device 1015. In this example, there was a slight delay of approximately 0.5 ms on the part of the server 952 to generate the audio/video data 1042 from the audio data 1040 (e.g., and from other sources). As shown, the audio/video data 1042 includes the audio data 1040 with a contribution to the Celebrity 3's total audio signal of 15%.

In stage (D), the celebrity 5G device 1015 transmits audio data 1044 to the server 952 over the 5G network 925. The audio data 1044 includes a statement "Hey Bob!" based on sound detected by the celebrity 5G device 1015 of the Celebrity 3 responding to the participant 105's greeting, "Hey Celebrity 3." The transmission of the audio data 1044 may correspond to a fourth time 1028—of, for example, approximately 1 ms plus Celebrity 3's reaction time—when the celebrity 5G device 1015 send the audio data 1044 to the server 952.

In stage (E), the server 952 receives the audio data 1044 from the celebrity 5G device 1015. The reception of the audio data 1044 corresponds to a fifth time 1030—of, for example, approximately 1.5 ms plus the reaction time of Celebrity 3—when the server 952 receives the audio data 1044. After receiving the audio data 1044, the server 952 may use the audio data 1044 along with other sources of audio data and/or video data to generate, for example, a composite audiovisual signal for the 5G device 915 and/or for one or more of the audio systems 954. The server 952 may do this in real-time or substantial real-time such that there is little if any significant delay. That is, the server 952 may use a computational mixer to combine the different and audio sources for the participant 105 in accordance with their audio settings (e.g., the general audio settings 960 shown in FIG. 9A or the advanced audio settings 962 shown in FIG. 9B) without significant processing time. As shown, the audio settings for the 5G device 915 provide that the audio corresponding to Celebrity 3 is to make up 20% of the audio component of the composite audiovisual signal provided to the 5G device 915.

In stage (F), the server 952 transmits audio/video data 1046 to the 5G device 915 over the 5G network 925. The audio/video data 1046 include the audio response from Celebrity 3 of "Hey Bob!" The contribution of the Celebrity 3's audio to the total audio signal for the participant 105 is 20%. The transmission of the audio/video data 1046 corresponds to the fifth time 1030—of, for example, approximately 1.5 ms plus the reaction time of Celebrity 3—when the server 952 sends the audio/video data 1046 to the 5G device 915 and to a sixth time 1032—of, for example, approximately 2 ms plus the reaction time of Celebrity 3—when the 5G device 915 receives the audio/video data 1046.

As depicted, streaming the audio and/or video data of an event to multiple remote participants while allowing communication between the remote participants can be achieved with very low latency through the use of a 5G network. Accordingly, the distributed audio/video system 1000B can provide a seamless virtual experience such that various remote participants can interact with each other and can react to the event itself without or substantially without any perceivable lag (e.g., of the game, in their conversations, in other participants' reactions to events, etc.).

The times 1022-990 in the timeline 980 may represent ideal times that can be achieved only using a 5G network. A 5G network may achieve times different than what is depicted in the example of FIG. 9C, however the times that can be achieved using a 5G network are significantly faster than what is possible using other cellular networks (e.g., 3G and 4G), and, thus, can be used to provide an environment with substantially reduced latency and an overall better virtual experience for the participants. In addition, although not shown, there may be processing times by the various devices of the distributed audio/video system 900C in extracting, loading, presenting, mixing, and/or packaging data (e.g., audio data, video data, etc.).

The augmented virtual environment (or entirely virtual environment) depicted in the interfaces 910a of FIG. 9A, 910b of FIG. 9B, and 1010 of FIG. 10A may allow the participant 105 to see different portions of the environment by, for example, changing their own orientation and/or performing actions. For example, the participant 105 may be shown the venue from a different perspective if they stand up. Similarly, the participant 105 may be able to see and/or interact with additional, different remote participants if they turn their head to the left or right.

Although FIGS. 10A-10B are described above with respect to 5G mobile networks, different low latency technologies or technology standards may be used in place of a 5G mobile network. Such technologies or technology standards may still be in development but can be, upon release, implemented with the other disclosed teaching to realize the benefits described herein. For example, instead of using the 5G network 925, the distributed audio/video system 1000 may use a 6G cellular over which a 6G enabled wireless device of the participant 105 can communicate with the venue audio/video system 950.

Figure 11:
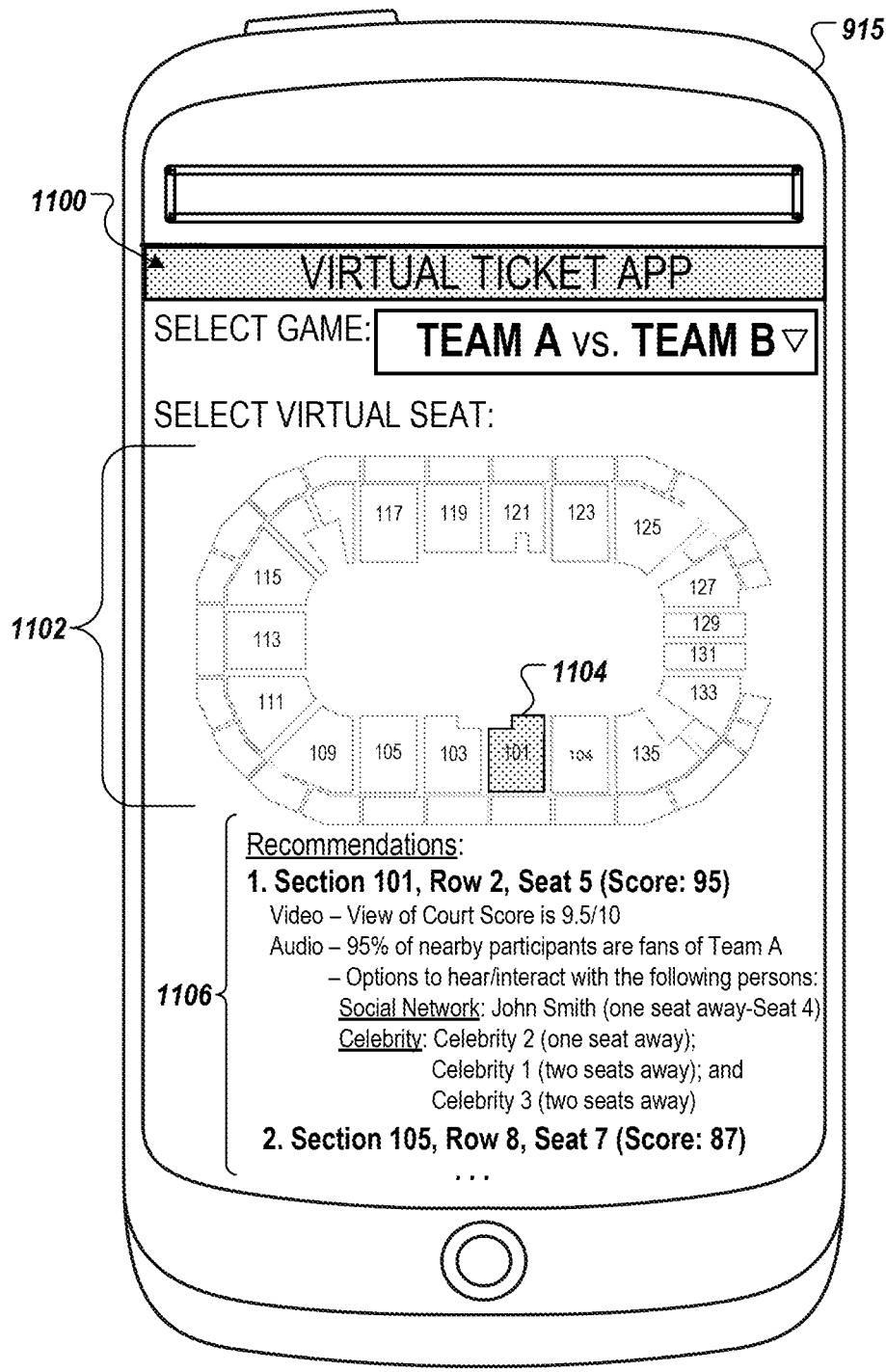
FIG. 11 is an example user interface for reserving virtual seats.

FIG. 11 is an example user interface 1100 for reserving virtual seats. The UI 1100 may be presented to the participant 105 on the 5G device 915. The UI 1100 may be presented as part of a virtual seat or a virtual ticket mobile application running on the 5G device.

As shown, the UI 1100 may allow the participant 105 to select a particular event that will be performed at a venue, such as a sports game or a concert. The participant 105 may, for example, use a dropdown menu to see upcoming events that will be performed in the venue (e.g., in the next week, next month, next six months, next year, etc.).

The UI 1100 may also present a representation 1102 of the venue. The representation 1102 may include, for example, depictions of the different seating sections for the venue. In some cases, the sections are dependent on the event selected by the participant. A section 1104 (Section 101) has been highlighted, e.g., due to the section 1104 being a section with one or more recommended virtual seats, being the section with the highest recommended virtual seat, and/or being selected by the participant 105. For example, after selecting the section 1104, the participant 105 may be presented a list 1106 of recommended seats in the selected section. As another example, the list 1106 of recommended seats may include the seats with the highest recommendations throughout the venue.

The recommended seats in the list 1106 may be selected by the 5G device 915 and/or the server 952 shown in FIG. 9C and FIG. 10B. In generating the list 1106, the 5G device 915 and/or the server 952 may generate a score the virtual seats (e.g., for each available virtual seat that has yet to be reserved). The score may be based on, for example, a view quality of the venue from the corresponding seat, an audio quality of the venue from the corresponding seat, other audio factor such as friends having reserved neighboring seats or celebrities having reserved neighboring seats. As an example, a video score may be generated and an audio score may be generated. These two scores may be used to generate an overall score for the seat (e.g., by averaging the scores, or applying particular weights to each of the scores). As an example, the server 952 may determine that seat 5 in row 2 of section 101 has a score of 95 based on having a video quality score of 95 (e.g., section is close to middle of the court and seat is the second row which is close to the court) and having an audio score of 95 (e.g., based on a friend being one seat away and having three celebrities in neighboring seats).

The list 1106 may be particular to the participant 105 or may be made for all participants. As an example, the server 952 may generate the list 1106 using information stored in a profile of the participant 105. The profile information may include, for example, a virtual seat reservation history for the participant 105. As an example, the server 952 may use the participant 105's virtual seat reservation history to determine that they only ever reserve seats in section 101, 103 or 105. In response to this determination, the server 952 may increase the score of virtual seats that are found available in those particular sections.

Reserving a virtual seat can include preventing other persons from reserving the same virtual seat. Accordingly, the audiovisual perspective of the virtual or augmented environment provided to a participant may be unique to them. In some cases, some virtual seats may optionally be made available to multiple participants (e.g., if an event is overbooked).

Figure 12:
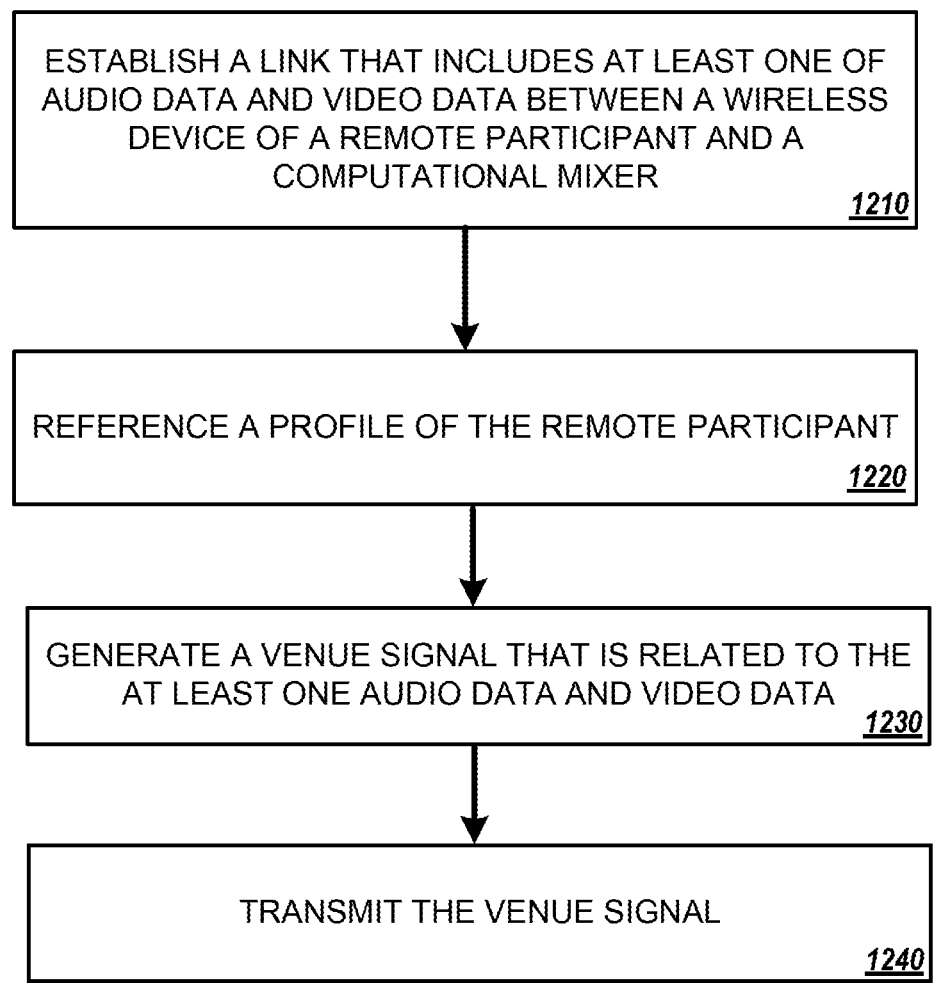
FIG. 12 is a flowchart of an example process of using a distributed audio/video system.

FIG. 12 is a flowchart of an example process 1200 of using a distributed audio/video system. The process 1200 can be performed by one or more computers or computing devices as discussed above. For example, the process 1200 can be performed by the wireless device 115 shown in FIG. 1, venue audio/video system 121 shown in FIG. 1, the computational mixer 640 shown in FIG. 6, the 5G device 915 shown in FIGS. 9A-9C and 10A-10B, or the venue audio/video system 950 shown in FIGS. 9A-9C and 10A-10B.

The process 1200 includes establishing a link that includes at least one of audio data and video data between a wireless device of a remote participant and a computational mixer (1210). For example, with respect to FIGS. 9A-9C, a link may be established between the 5G device 915 of the remote participant 105 and the server 952 of the venue audio/video system 950. The server 952 and/or the venue audio/video system 950 may include a computational mixer (e.g., that includes an audio mixer and/or video mixer), such as the computational mixer 640 shown in FIG. 6. The computational mixer may interface audio transmissions of the remote participants, video transmissions of the remote participants, and/or other audio and/or video transmissions (e.g., video and/or audio data of the event such as the professional audio/visual source 630 and/or the ambient audio source 620 shown in FIG. 6) with virtual reality graphics from a game engine, and proceed to composite the transmissions together in real-time or substantially real-time. The resulting composite may then be fed to the participant.

The process 1200 includes referencing a profile of the remote participant (1220). For example, the server 952 may access a profile stored for the participant 105. The profile may include, for example, a virtual seat reservation history for the participant, audio settings for the participant, celebrity settings for the participant, virtual/augmented environment presentation settings, etc.

The process 1200 includes generating a venue signal that is related to the at least one audio data and video data (1230). The venue signal may be a composite signal that is generated from multiple different sources. For example, the mixer 640 may combine multiple audio streams from remote participants, ambient audio data, and professional audio data in accordance with the audio settings in the profile of the participant 105 to generate a composite audio signal (or an audio component to a composite audiovisual signal). The venue signal may also include video data from various sources, such as the audio sources mentioned. The venue signal may be particular to a particular participant or a particular group of participants (e.g., all having reserved virtual seats in the same section). Alternatively, the venue signal may be, for example, an audio and/or video signal that is to be outputted in the venue, in a particular section of the venue (e.g., using one or more speakers and/or displays in the venue), or using particular devices (e.g., particular speakers and/or displays) in the venue.

The process 1200 includes transmitting the venue signal (1240). For example, the server 952 may transmit the venue signal (e.g., the composite audiovisual signal) to the 5G device 915 of the participant 105. The 5G device 915 may use the venue signal to output audio and/or video data of a virtual environment corresponding to the seat in the venue that the participant 105 reserved. For example, the 5G device 915 may generate the interface 910a shown in FIG. 9A using the venue signal. As another example, the venue signal may be transmitted to the audio systems 954 of the venue audio/video system 950. The audio systems 954 or a specific system in the audio systems 954 may output the audio signal using one or more speakers (e.g., a set of speakers for a particular section of a venue) and/or displays.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, the method comprising:
   establishing a link that includes at least one of audio data and video data between a wireless device of a remote participant and a computational mixer;
   referencing a profile for the remote participant;
   generating, based on the profile for the remote participant and using the computational mixer, a venue signal that is related to the at least one audio data and video data; and
   transmitting the venue signal;
   wherein referencing the profile for the remote participant includes referencing the profile to determine that remote participant has selected to interact with a second remote participant identified in the profile, and
   wherein generating the venue signal comprises:
     generating a first venue signal by providing at least one of audio data and video data from the remote participant to the computational mixer;
     transmitting the first venue signal to a wireless device of the second remote participant;
     generating a second venue signal by providing at least one of audio data and video data from the second remote participant to the computational mixer; and
     transmitting the second venue signal to the wireless device of the remote participant.

2. The method of claim 1, wherein establishing the link includes establishing the link between a virtual participant application on the wireless device and a communications interface on the computational mixer.

3. The method of claim 2, wherein establishing the link between the virtual participant application on the wireless device and the communications interface on the computational mixer includes transmitting at least one of audio data and video data corresponding to the remote participant from the wireless device to the computational mixer.

4. The method of claim 2, wherein establishing the link between the virtual participant application on the wireless device and the communications interface on the computational mixer includes transmitting at least one of audio data and video data from the computational mixer to the wireless device.

5. The method of claim 2, wherein establishing the link between a virtual participant application on the wireless device and a communications interface on the computational mixer includes establishing a 5G network connection.

6. The method of claim 1, wherein establishing the link comprises establishing a link that is used to communicate one or more of the following:
   audio data of the remote participant;
   video data of the remote participant;
   audio data of one or more other remote participants;
   video data of one or more other remote participants;
   audio data recorded by one or more microphones in a venue hosting an event that the remote participant is virtually attending;
   video data recorded using one or more cameras in a venue hosting an event that the remote participant is virtually attending;
   audio data of one or more performers of an event that the remote participant is attending;
   video data of one or more performers of an event that the remote participant is attending;
   audio data of one or more hosts of an event that the remote participant is attending; or
   video data of one or more hosts of an event that the remote participant is attending.

7. The method of claim 1, wherein referencing the profile for the remote participant includes referencing a social media configured to enable access to other profiles for other users.

8. The method of claim 1, wherein referencing the profile for the remote participant includes referencing a designated location within a venue hosting an event that the remote participant is virtually attending.

9. The method of claim 1, wherein referencing the profile for the remote participant includes referencing a logical transformation that describes a modification to the at least one audio data and video data.

10. The method of claim 9, wherein referencing the logical transformation includes referencing a transformation that modifies the at least one audio data and video data so that the at least one audio data and video data is perceived as originating from a location other than a location associated with at least one of:
    a speaker used to provide an audio manifestation of the venue signal;
    headphones used to provide an audio manifestation of the venue signal;
    earphones used to provide an audio manifestation of the venue signal; or
    a display used to provide a video manifestation of the venue signal.

11. The method of claim 9, wherein referencing a logical transformation includes referencing a transformation that modifies at least a portion of the at least one audio data and video data that corresponds to other remote participants based on one or more of the following:
    a distance from a location corresponding to the remote participant to a location corresponding to a remote participant of the other remote participants;
    an identity of a remote participant of the other remote participants;
    a remote participant of the other remote participants being identified as a friend of the remote participant;
    a remote participant of the other remote participants being identified as a family member of the remote participant; or
    a remote participant of the other remote participants being identified as a celebrity.

12. The method of claim 1, wherein referencing the profile for the remote participant includes referencing the profile to determine that the remote participant has selected to receive at least one of audio data and video data from a second remote participant identified in the profile, and
    wherein generating the venue signal comprises providing the at least one of audio data and video data from the second remote participant to the computational mixer.

13. The method of claim 1, wherein referencing the profile for the remote participant includes identifying a speaker that will be used to render an audio manifestation of the venue signal.

14. The method of claim 1, wherein referencing the profile for the remote participant includes identifying at least one of:
    an event that the remote participant has registered to virtually attend; or
    a venue hosting an event that the remote participant has registered to virtually attend.

15. The method of claim 1, wherein generating, based on the profile for the remote participant and using the computational mixer, the venue signal includes identifying a speaker that will be used to render an audio manifestation of the venue signal.

16. The method of claim 1, wherein generating, based on the profile for the remote participant and using the computational mixer, the venue signal comprises specifying a volume level for the venue signal.

17. The method of claim 1, wherein generating, based on the profile for the remote participant and using the computational mixer, the venue signal comprises mixing the at least one of audio data and video data for the remote participant with other audio data and/or video data from other users to generate the venue signal.

18. The method of claim 1, wherein generating, based on the profile for the remote participant and using the computational mixer, the venue signal comprises mixing at least one of audio data and video data for two or more users in a social network.

19. The method of claim 1, wherein generating, based on the profile for the remote participant and using the computational mixer, the venue signal comprises mixing the at least one of audio data and video data for the remote participant with one or more of the following:
    audio data captured using one or more microphones in a venue corresponding to an event that the remote participant is virtually attending;
    video data captured using one or more cameras in a venue corresponding to an event that the remote participant is virtually attending;
    audio data corresponding to one or more performers of the event in the venue;

video data corresponding to one or more performers of the event in the venue;
audio data corresponding to one or more hosts of the event in the venue;
video data corresponding to one or more hosts of the event in the venue;
audio data corresponding to one or more other remote participants virtually attending the event in the venue; or
video data corresponding to one or more other remote participants virtually attending the event in the venue.

20. The method of claim 1, wherein generating, based on the profile for the remote participant and using the computational mixer, the venue signal comprises:
accessing at least one of audio and video settings specified in the profile for the remote participant; and
generating the venue signal based on the at least one audio and video settings.

21. The method of claim 20, wherein:
accessing the at least one audio and video settings comprises accessing one or more of the following:
audio power contribution settings corresponding to sources of audio data;
audio power contribution settings corresponding to particular remote participants;
audio power contribution settings corresponding to particular group of remote participants;
audio power contribution settings corresponding to virtual distances between virtual seats reserved by other remote participants and a virtual seat of the remote participant;
video settings corresponding to sources of video data;
video settings corresponding to particular remote participants;
video settings corresponding to a particular group of remote participants;
video settings corresponding to virtual distances between virtual seats reserved by other remote participants and a virtual seat of the remote participant;
interactivity settings corresponding to particular remote participants;
interactivity settings corresponding to a particular group of remote participants; or
interactivity settings corresponding to virtual distances between virtual seats reserved by other remote participants and a virtual seat of the remote participant; and
generating the venue signal based on the at least one audio and video settings comprises generating the venue signal based on the accessed settings.

22. The method of claim 1, wherein transmitting the venue signal comprises enabling a venue sound system to access the venue signal.

23. The method of claim 22, wherein enabling the venue sound system to access the venue signal includes transmitting the venue signal to a particular speaker or group of speakers using a network connection.

24. The method of claim 22, wherein enabling the venue sound system to access the venue signal includes routing the venue signal to a particular amplifier.

25. The method of claim 22, wherein transmitting the venue signal comprises transmitting the venue signal to a wireless device of the remote participant.

26. The method of claim 25, wherein transmitting the venue signal to the wireless device of the remote participant comprises transmitting the venue signal to the wireless device to present a virtual reality environment to the remote participant or an augmented reality environment to the remote participant.

27. The method of claim 26, wherein the wireless device or one or more second devices that are capable of communicating with the wireless device include one or more of the following:
a television in proximity to the remote participant;
a speaker in proximity to the remote participant;
headphones worn by the remote participant;
earphones worn by the remote participant; or
a virtual reality headset worn by the remote participant.

28. The method of claim 1, wherein establishing the link comprises establishing a link that includes audio data between a remote participant and the computational mixer that includes an audio mixer.

29. The method of claim 1, wherein establishing the link comprises establishing a link that includes video data between the remote participant and the computational mixer that includes a video mixer.

30. The method of claim 28, wherein generating the venue signal comprises generating a venue signal that is related to the video data establishing the link.

31. The method of claim 29, wherein generating the venue signal that is related to the video data comprises:
generating one or more three-dimensional models corresponding to at least one of the remote participant or one or more other remote participants; and
using the computation mixer to composite the one or more three-dimensional models with video data captured from a camera in a venue hosting an event that the remote participant is virtually attending.

32. A system comprising:
one or more computers; and
one or more computer-readable media storing instructions that, when executed, cause the one or more computers to perform operations comprising:
establishing a link that includes at least one of audio data and video data between a wireless device of a remote participant and a computational mixer;
referencing a profile for the remote participant;
generating, based on the profile for the remote participant and using the computational mixer, a venue signal that is related to the at least one audio data and video data; and
transmitting the venue signal;
wherein referencing the profile for the remote participant includes referencing the profile to determine that remote participant has selected to interact with a second remote participant identified in the profile, and
wherein generating the venue signal comprises:
generating a first venue signal by providing at least one of audio data and video data from the remote participant to the computational mixer;
transmitting the first venue signal to a wireless device of the second remote participant;
generating a second venue signal by providing at least one of audio data and video data from the second remote participant to the computational mixer; and
transmitting the second venue signal to the wireless device of the remote participant.

33. One or more non-transitory computer-readable media storing instructions that, when executed by one or more computers, cause the one or more computers to perform operations comprising:

establishing a link that includes at least one of audio data and video data between a wireless device of a remote participant and a computational mixer;

referencing a profile for the remote participant;

generating, based on the profile for the remote participant and using the computational mixer, a venue signal that is related to the at least one audio data and video data; and transmitting the venue signal;

wherein referencing the profile for the remote participant includes referencing the profile to determine that remote participant has selected to interact with a second remote participant identified in the profile, and wherein generating the venue signal comprises:
- generating a first venue signal by providing at least one of audio data and video data from the remote participant to the computational mixer;
- transmitting the first venue signal to a wireless device of the second remote participant;
- generating a second venue signal by providing at least one of audio data and video data from the second remote participant to the computational mixer; and
- transmitting the second venue signal to the wireless device of the remote participant.

* * * * *